US011135881B2

(12) United States Patent
Hall et al.

(10) Patent No.: US 11,135,881 B2
(45) Date of Patent: Oct. 5, 2021

(54) TRAILER AND A TOW VEHICLE PATH OPTIMIZATION

(71) Applicant: Hall Labs LLC, Provo, UT (US)

(72) Inventors: David R. Hall, Provo, UT (US); Michael Hall, Provo, UT (US); Seth Myer, Provo, UT (US)

(73) Assignee: Hall Labs LLC, Provo, UT (US)

( * ) Notice: Subject to any disclaimer, the term of this patent is extended or adjusted under 35 U.S.C. 154(b) by 167 days.

(21) Appl. No.: 16/242,959

(22) Filed: Jan. 8, 2019

(65) Prior Publication Data

US 2019/0210418 A1    Jul. 11, 2019

Related U.S. Application Data

(60) Provisional application No. 62/615,139, filed on Jan. 9, 2018, provisional application No. 62/615,156, filed
(Continued)

(51) Int. Cl.
*B60D 1/24*    (2006.01)
*B60D 1/30*    (2006.01)
(Continued)

(52) U.S. Cl.
CPC ............... *B60D 1/30* (2013.01); *B60D 1/245* (2013.01); *B60D 1/62* (2013.01); *B60W 10/04* (2013.01);
(Continued)

(58) Field of Classification Search
CPC ............ B60D 1/30; B60D 1/62; B60D 1/245; B60W 20/10; B60W 10/20; B60W 10/04;
(Continued)

(56) References Cited

U.S. PATENT DOCUMENTS

2014/0267688 A1\* 9/2014 Aich ................. B60W 50/0097
348/113
2015/0344067 A1\* 12/2015 Lavoie ................. B62D 15/027
701/41
(Continued)

*Primary Examiner* — Abby Y Lin
*Assistant Examiner* — Hossam M Abd El Latif

(57) ABSTRACT

The invention is a system for optimizing a trailer path and a tow vehicle path. The system includes image sensors configured to capture images of a trailer and images of a path of travel both in front of and behind the trailer and tow vehicle, a weight determination system, accelerometers that sense acceleration of the tow vehicle and/or the trailer, a data input device configured to receive input data, and a processing device. The processing device includes a processor and non-volatile memory. The processor is configured to receive image data from the image sensors, receive weight data from the weight determination system, receive accelerometer data from the one or more accelerometers and receive the input data from the data input device. Additionally, the processor is configured to determine a trailer path and a tow vehicle path based on the image data, accelerometer data, and the input data. The processor is also configured to determine a safety parameter, communicate the trailer path and tow vehicle path to a user or vehicle control system, thereby prompting adjustments to the tow vehicle path and or acceleration when the trailer path or tow vehicle path is not optimum.

19 Claims, 13 Drawing Sheets

Related U.S. Application Data on Jan. 9, 2018, provisional application No. 62/615,128, filed on Jan. 9, 2018, provisional application No. 62/614,728, filed on Jan. 8, 2018.

(51) Int. Cl.

| | |
|---|---|
| *B60D 1/62* | (2006.01) |
| *B60W 10/04* | (2006.01) |
| *B60W 10/20* | (2006.01) |
| *B60W 30/00* | (2006.01) |
| *B60W 30/02* | (2012.01) |
| *B60W 30/045* | (2012.01) |
| *B60W 20/10* | (2016.01) |

(52) U.S. Cl.
CPC ............ *B60W 10/20* (2013.01); *B60W 20/10* (2013.01); *B60W 2300/14* (2013.01); *B60W 2420/42* (2013.01); *B60W 2520/105* (2013.01); *B60W 2520/125* (2013.01); *B60W 2530/10* (2013.01)

(58) Field of Classification Search
CPC ......... B60W 2530/10; B60W 2420/42; B60W 2520/105; B60W 2520/125; B60W 2300/14; B60W 2554/00; B60W 30/045; B60W 30/02; B60W 30/00
USPC .......................................................... 701/22
See application file for complete search history.

(56) References Cited

U.S. PATENT DOCUMENTS

| | | | | |
|---|---|---|---|---|
| 2016/0245659 | A1* | 8/2016 | Ohba | B62D 13/06 |
| 2017/0153639 | A1* | 6/2017 | Stein | B60W 30/16 |
| 2017/0341583 | A1* | 11/2017 | Zhang | B60R 1/00 |
| 2018/0359298 | A1* | 12/2018 | Grimm | H04L 65/4084 |
| 2019/0009815 | A1* | 1/2019 | Lavoie | B60W 40/114 |
| 2019/0039595 | A1* | 2/2019 | Hawley | B60W 20/30 |
| 2019/0337344 | A1* | 11/2019 | Yu | H04N 5/2253 |

* cited by examiner

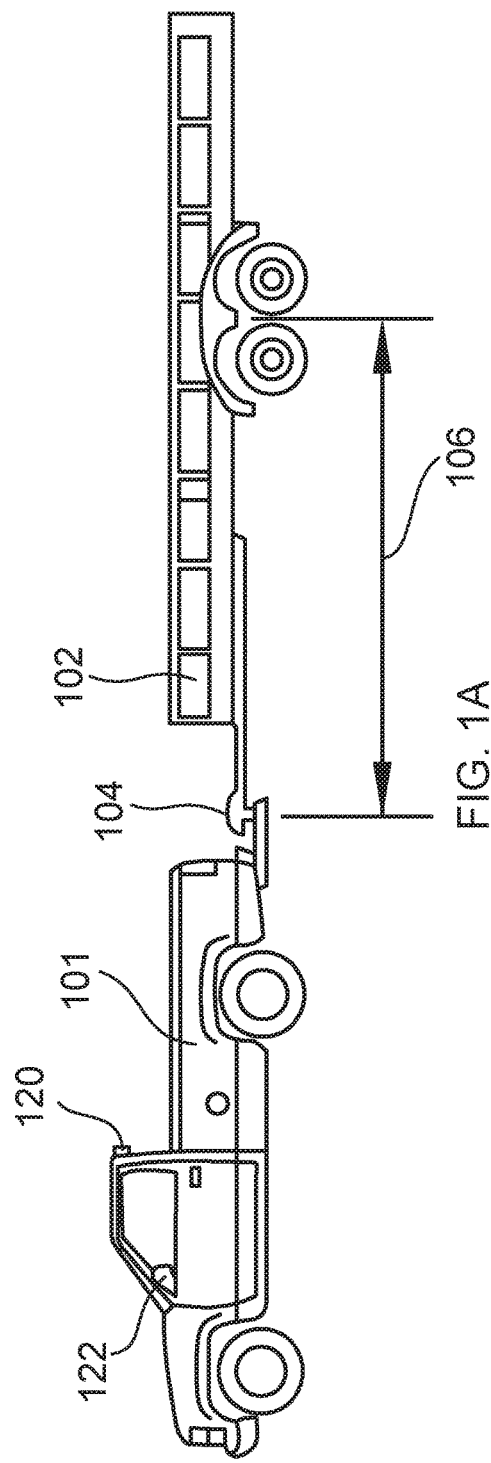
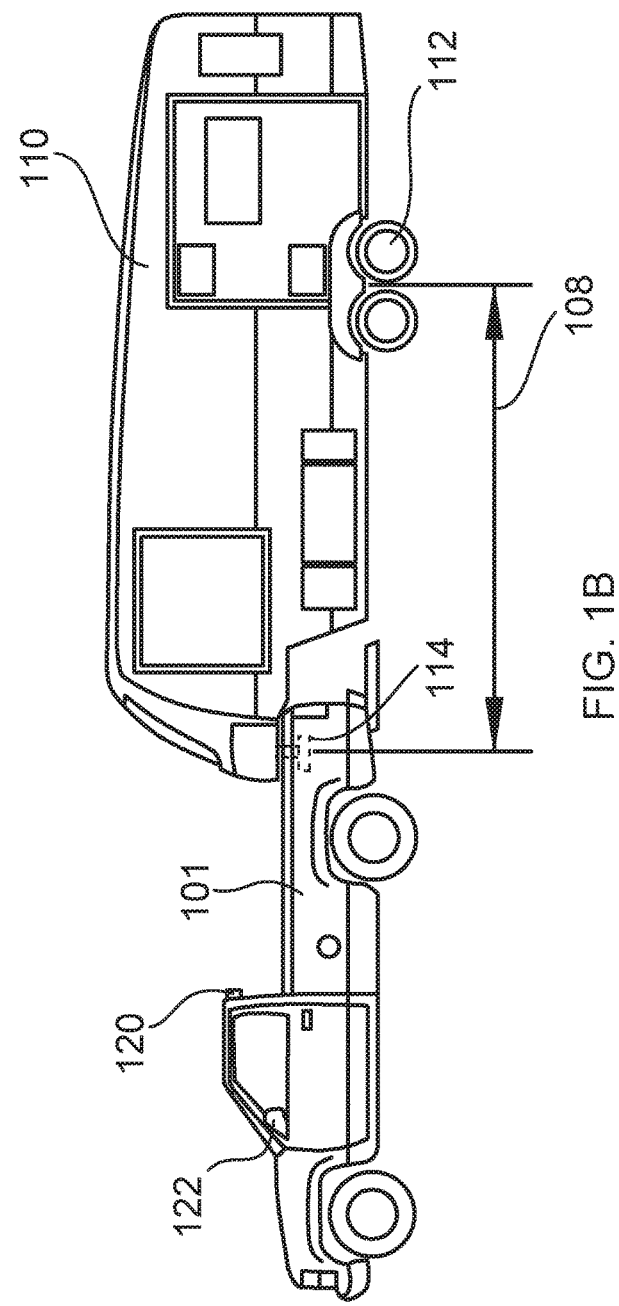

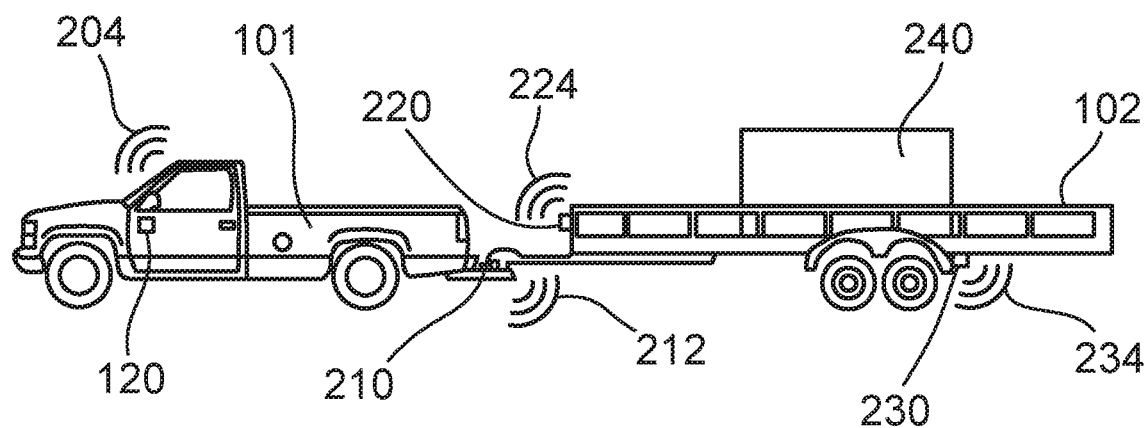
FIG. 2A
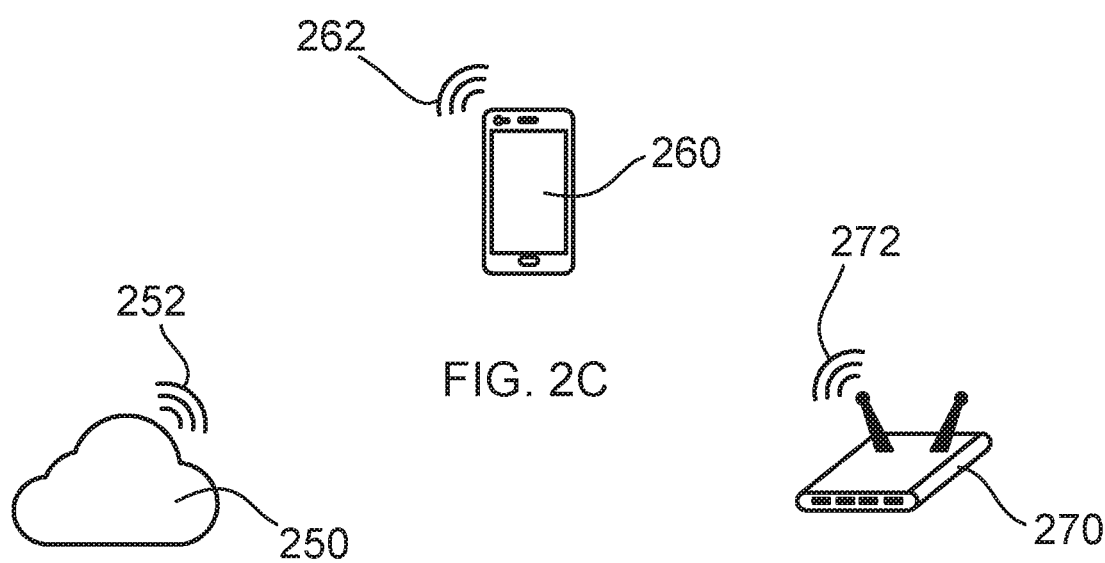
FIG. 2B
FIG. 2C
FIG. 2D

TRAILER AND A TOW VEHICLE PATH OPTIMIZATION

CROSS-REFERENCE TO RELATED APPLICATIONS

The present application is a continuation-in-part of U.S. Provisional Application No. 62/614,728, filed Jan. 8, 2018, entitled "Auto Trailer Detection and Hookup (ATDH)", and a continuation-in-part of U.S. Provisional Application No. 62/615,128, filed Jan. 9, 2018, entitled "Automatic Travel Trailer Towing (ATTT)", and a continuation-in-part of U.S. Provisional Application No. 62/615,139, filed Jan. 9, 2018, entitled "Automatic Boat Launching (ABL)", and a continuation-in-part of U.S. Provisional Application No. 62/615,156, filed Jan. 9, 2018, entitled "Automatic Moving Truck and Trailers (AMTT)". The entire disclosures of these prior applications are incorporated by reference.

TECHNICAL FIELD

This invention generally relates to systems that optimize a trailer path and a tow vehicle path.

BACKGROUND

The act of backing up a vehicle with an attached trailer can be a challenging maneuver even for individuals with considerable driving experience. Such maneuvers often require counterintuitive inputs, making them error-prone, cumbersome, frustrating, and dangerous, especially for inexperienced drivers. A common mistake when backing up a vehicle and trailer is to "jack knife" or "bind" the vehicle and trailer during the reverse motion. When this occurs, the driver is prevented from being able to steer the vehicle and trailer any further along its desired path. Backup maneuvers are particularly difficult with long wheelbase dual-axle trailers (as compared to single axle trailers), thus leaving the driver even more prone to jack knifing or binding.

People who need to move items have to reserve and drive (or have someone drop them off) at a rental center. After use, they have to repeat the process. For many trips, this time and effort is more work than the move itself. In addition, many do it yourselfers are unfamiliar with trucks and trailers, so renting these items is intimidating, and dangerous.

Travel trailers are luxurious spaces that drivers haul to and from vacation spots. Unfortunately, while in transit, the travel trailers sit empty while the occupants crowd into the tow vehicle. For families that spend a lot of time in an RV, the driver must spend the time with eyes on the road, instead of doing more productive work or play. Tow vehicles could drive themselves to and from storage lots, dump and fill stations, etc. further enhancing the luxury. Also, RV hailing businesses could share assets. User would call up the RV on a mobile app, and the RV would pick up the family for the weekend.

Automated vehicles will make the highways safe enough for travelers to "move about the cabin" on freeways. This will affect Travel trailer design, making large windows for viewing scenery while on journey. Also, an office where occupants can perform work while travelling, will allow everyone to play when the destination is reached.

Backing up a tow vehicle to attach to a trailer can be difficult. In most cases it is only possible to align the trailer hitch with the ball on the back of a truck by having two people: the first person driving the truck and a second person standing near the trailer and guiding the driver with hand signals. The second person has a vantage point allowing them to actual visually check the alignment of the hitch with the ball. Without a second person to guide this process, the driver must guess and try to get as close as possible, then get out of the truck to visually check. After the visual check it may still take several times to get it properly aligned.

In some cases, the trailer may be a boat trailer that must be backed down a boat ramp. The same challenges may be encountered of jackknifing or avoiding obstacles such as a boat dock next to the ramp. Additional features such as the slope of the boat ramp and the depth of the water may also influence the process of backing the trailer & boat into the water for launching.

The length of the trailer influences the process of backing up. Short trailers are more sensitive to changes in the angle or pitch of the trailer with respect to the tow vehicle and can jack knife very quickly if care is not taken to make necessary adjustments while steering the vehicle.

In addition to potential problems while backing up a trailer, even the forward motion of a vehicle towing a trailer may present possible hazards. Towing a trailer of unknown length and weight may cause a condition known as off-tracking. Due to their size and weight, vehicles pulling trailers are challenging to operate safely in traffic. Off-tracking may cause drivers of a vehicle towing a trailer difficulty in negotiating turns. Off-tracking is when the rear wheels of the trailer travel in a different path around turns and curves than the front wheels do, an effect that frequently results in accidents. Because this is a known effect, truck wreck attorneys maintain that it is the truck driver's responsibility to prevent accidents through careful driving and negotiation of turns.

Off-tracking is when a Longer Combination Vehicle (LCV) like a tractor trailer makes a turn or negotiates a ramp, and the rear wheels of the trailer end up driving in a different path than the tractor and the front wheels of the trailer. This happens in conditions where there is not enough space for the driver to make a wide turn that prevents off-tracking, such as turning on city streets or tight highway on ramp curves. Trailers that off-track usually run over curbs when turning to the right and invade oncoming traffic lanes when turning to the left. Also, in these tighter situations, the longer the trailer, or combination of trailers, the greater the amount of off-tracking.

Off-tracking is a common cause of accidents that range from minor to severe. The usual way that these occurrences happen is when trucks end up driving into other vehicles in their path, or sometimes even unsuspecting pedestrians. At slow speeds such as negotiating city streets this effect is known to cause many fender-bender type accidents, but when off-tracking happens at higher speeds, such as when negotiating a tight curve in the road or an on- or off-ramp, cars can be sideswiped by a truck's rear wheels, and a bigger, more dangerous accident can occur as a result.

Although it is impossible for truck drivers to avoid off-tracking in many situations, especially when negotiating tight city streets, there are specific, and safe ways in which off-tracking should be handled. Most importantly, drivers must drive slowly enough to carefully make their turns, stopping if it seems they will run into other vehicles, pedestrians or objects along the side of the road. It is the duty of the truck driver to yield to other traffic when it becomes obvious that the truck cannot make its turn without driving into the path of oncoming cars, or onto the sidewalk, and give those vehicles and people the chance to move out of the way. Careless driving and truck drivers who are moving too fast in close conditions are generally the cause of these kinds of accidents.

When trucks fail to stop, or drivers try to stop too late, they may end up hitting something or someone. Drivers of any vehicle, not just big trucks, who are in a hurry tend to make poor judgment decisions, such as those that lead to off-tracking accidents. For this reason, most off-tracking accidents are found to be the fault of truck drivers.

While off-tracking may not be avoidable in some instances, especially with longer trucks, or multi-trailer LCVs, knowing the appropriate way to deal with it is essential. When truck drivers are careless, tractor trailer accidents caused by off-tracking happen and people are injured.

In order to properly maneuver a trailer being towed, it is important to know the length of the trailer. Determining the limits for hitch angle (position of trailer with respect to the tow vehicle) is necessary to determine the extent of off-tracking, and to prevent jack knifing.

The length of the trailer must be known in order to properly determine allowable hitch angles. Jackknifing during backing up of trailers occurs when the hitch angle increases to a point such that the vehicle and trailer fold together about the hitch point like a jackknife. If the backward motion is continued, the jackknife effect progressively worsens, until the vehicle and trailer are in physical contact with each other. Jackknifing can result in traffic disruptions and wasted time and can potentially cause damage or personal injury.

Therefore, a system is needed to determine the optimum path for a trailer being pulled by a tow vehicle. The system should communicate this optimum path to a user or driver so that adjustments may be made to the tow vehicle's path in order to achieve the desired optimum trailer path. In the case of an autonomous or Advanced Driver Assisted (ADA) vehicle, the optimum trailer and tow vehicle path should be communicated to the vehicle control system.

SUMMARY

In one aspect, the invention is a system for optimizing a trailer path and a tow vehicle path. The system includes image sensors configured to capture images of a trailer and images of a path of travel both in front of and behind the trailer and tow vehicle, a weight determination system, accelerometers that sense acceleration of the tow vehicle and/or the trailer, a data input device configured to receive input data, and a processing device. The processing device includes a processor and non-volatile memory. The processor is configured to receive image data from the image sensors, receive weight data from the weight determination system, receive accelerometer data from the one or more accelerometers and receive the input data from the data input device. Additionally, the processor is configured to determine a trailer path and a tow vehicle path based on the image data, accelerometer data, and the input data. The processor is also configured to determine a safety parameter, communicate the trailer path and tow vehicle path to a user or vehicle control system, thereby prompting adjustments to the tow vehicle path and or acceleration when the trailer path or tow vehicle path is not optimum. The acceleration may be positive or negative (deceleration when braking, for example).

In a preferred embodiment, the system may utilize tractrix involute curves to describe the motion of the tow vehicle and trailer to predict future trailer path and vehicle path. The system may also include sensors on the tow vehicle and trailer. The image sensors may be mounted on the back and front of the tow vehicle, on the rear-view mirrors and on the front and back of the trailer. The system may further determine length and width of the trailer. The system may also include a monitoring device that sends the image data, the accelerometer data, and the input data to a monitoring system and to a vehicle control system of either standard or hybrid vehicles. The system may communicate via a wireless interface. The system may further build a model of a set-up for a specific tow vehicle connected to a specific trailer. The system may also include a cloud-based network for monitoring, control and system back-up. The data input device may be a cell phone or mobile device. The system may further monitor the behavior of a tow vehicle and trailer for a specific trip, make adjustments to the model and store the adjusted model in memory. The system may operate when the tow vehicle and trailer are travelling in either a forward or reverse direction. The system may also guide the alignment of the tow vehicle while backing up to a trailer.

Features and advantages of different embodiments of the invention will become more fully apparent from the following description and appended claims or may be learned by practice of the invention as set forth hereinafter.

Consistent with the foregoing, a system for optimizing a trailer path and tow vehicle path is disclosed. The objectives of the system are to determine a trailer path and tow vehicle path based on the image data, accelerometer data, and the input data and communicate the trailer path to a user or vehicle control system, thereby prompting adjustments to the tow vehicle path and or acceleration when the trailer path is not optimum. The system may utilize tractrix involute curves to describe the motion of the tow vehicle and trailer to predict future trailer path and vehicle path. The system may also include sensors on the tow vehicle and trailer. The image sensors may be mounted on the back and front of the tow vehicle, on the rear-view mirrors and on the front and back of the trailer. The system may further determine length and width of the trailer. The system may also include a monitoring device that sends the image data, the accelerometer data, and the input data to a monitoring system and to a vehicle control system of either standard or hybrid vehicles. The system may communicate via a wireless interface. The system may further build a model of a set-up for a specific tow vehicle connected to a specific trailer. The system may also include a cloud-based network for monitoring, control and system back-up. The data input device may be a cell phone or mobile device. The system may further monitor the behavior of a tow vehicle and trailer for a specific trip, make adjustments to the model and store the adjusted model in memory. The system may operate when the tow vehicle and trailer are travelling in either a forward or reverse direction. The system may also guide the alignment of the tow vehicle while backing up to a trailer.

In a preferred embodiment, a system for optimizing a trailer path and tow vehicle path may include at least one trailer image sensor configured to capture images of a trailer attached to a tow vehicle. The system may also include at least one front image sensor configured to capture front images of a vehicle path in front of the tow vehicle, at least one behind image sensor configured to capture behind images of a vehicle path behind the tow vehicle and behind the trailer, one or more accelerometers that sense acceleration of at least one of the tow vehicle and the trailer, a weight determination system, a data input device configured to receive input data, and a processing device. The processing device may include a processor and non-volatile memory.

The processor may be configured to receive image data from the image sensor, receive load ratings for a tow vehicle and tow equipment, receive weight data from the weight determination system, receive accelerometer data from the one or more accelerometers and receive input data from the data input device. The processing device may further determine a trailer path based on the image data, accelerometer data, and the input data. The processing device may also determine at least one safety parameter based on the trailer path, the load ratings, the weight data, the accelerometer data and the input data. The processing device may communicate the trailer path and the at least one safety parameter to a user or vehicle control system, thereby prompting adjustments to at least one of the tow vehicle path and tow vehicle acceleration when at least one of the trailer path and acceleration are not within the at least one safety parameter.

In an embodiment, tractrix involute curves may be utilized to predict behavior data for the tow vehicle attached to the trailer. The behavior data may include data describing motion of the tow vehicle, motion of the trailer, motion of the trailer with respect to the tow vehicle, trailer path and vehicle path. The processor may also be configured to predict a future vehicle path and a future trailer path based on the behavior data.

In another embodiment, the trailer image sensors may be mounted on at least one of: the back of the tow vehicle; the sides of the tow vehicle; the rear-view mirrors of the tow vehicle; the sides of the tow vehicle; on the trailer; and combinations thereof. The trailer image sensors may capture images of a travel path behind the tow vehicle and a travel path behind the trailer.

In one embodiment, the front image sensors may be mounted on at least one of the front of the tow vehicle and on the front of the trailer; wherein the front image sensors may capture images of a travel path in front of a forward travel path.

In certain embodiments, the behind image sensors are mounted on at least one of the back the tow vehicle and on the back of the trailer. The behind image sensors may capture images of a travel path behind the tow vehicle and behind the trailer. The trailer image sensors; front image sensors and behind image sensors may capture images representing obstructions to a clear travel path. The system may send a stop signal to at least one of the user and the vehicle control system when no clear travel path is found around the obstructions.

In other embodiments, the input device may also include one or more sensors. The one or more sensors produce sensor data. The image sensors may be mounted on the back of the tow vehicle, on the sides of the tow vehicle, and/or on the rear-view mirrors of the tow vehicle. The processor may also determine length and width of the trailer.

In one embodiment, the system may include a monitoring device that communicates the image data, the accelerometer data, and the input data to a monitoring system. The monitoring device may communicate the image data, the accelerometer data, the at least one safety parameter and the input data to the vehicle control system. The system may send at least one control command to the vehicle control system, controlling the operation of a tow vehicle based on the determined vehicle path. The system may send at least one control command to a hybrid vehicle control system, controlling the operation of a hybrid tow vehicle's electric motor and internal combustion engine based on the determined vehicle path.

In another embodiment, the input device may be an OBD device connected by a plug-in connector to a vehicle OBD port. The system may send at least one control command to a vehicle computer server.

In a certain embodiment, the input device may receive and transmit data via a wireless interface. The wireless interface may utilize a protocol of at least one of a Bluetooth, Bluetooth mesh, WIFI, NFC, RFID, BLE, ZigBee, Z-wave, LoRaWAN, Dash7, DigiMesh, ANT, ANT+, NB-IoT, 3G, 4G, 5G, LTE or combinations thereof.

In an embodiment, the processor may be configured to build a model of a set-up for a specific tow vehicle connected to a specific trailer. The model may determine at least one mode based on the data associated with the set-up for the model. The model may then be stored in the non-volatile memory. The system may also receive user settings and communicate the user settings for the model to the vehicle control system. The system may also alert the user to the settings for the model. The non-volatile memory may store factory settings and user settings specific to the model.

In certain embodiments, the system may also include a cloud-based network. Factory settings, the user settings and the sensor data may be stored in the memory of the cloud-based network. The cloud-based network processor may be configured to determine set-up specific settings for a specific towing set-up of tow vehicle, trailer and all associated tow equipment, and transmit the set-up specific settings to the system based on the sensor data, the factory settings, and the user settings.

In another embodiment, the data input device may include a cell phone, satellite phone, smartphone, personal digital assistant, tablet computer, laptop computer, remote control device, mobile transmitter, a mobile internet device or a combination of one or more of the same.

In an embodiment, the sensors may convert sensor data to an electrical signal. The sensors may include at least one of: electromagnetic; electrochemical; electric current; electric potential; magnetic; radio; air flow; accelerometers; pressure; electro-acoustic; electro-optical; photoelectric; electrostatic; thermoelectric; radio-acoustic; environmental; moisture; humidity; fluid velocity; position; angle; displacement; or combinations thereof.

In one embodiment, the system may also monitor, via the sensors, behavior of a vehicle and its components while driving on a specific trip. Adjustments to the model for the specific trip based on the specific trip sensor data and input data may then be made. An adjusted model based on the adjustments may then be stored in the non-volatile memory.

In other embodiments, the system may operate when the tow vehicle and the trailer are travelling in a forward direction. The system may also operate when the tow vehicle and the trailer are travelling in a reverse direction.

In certain embodiments, the system may operate when the tow vehicle is not connected to the trailer. In this case, the trailer may be in a stationary position, and the tow vehicle may be backing up in a reverse direction travelling towards the trailer's trailer hitch. The system further include at least one trailer alignment sensor configured to capture images of the trailer, and at least one tow vehicle alignment sensor configured to capture images of the tow vehicle. The tow vehicle alignment sensor may be attached to the trailer, and the trailer alignment sensor may be attached to the tow vehicle. At least one hitch position sensor may be configured to determine position of the trailer hitch. At least one receiver position sensor may be configured to align the trailer hitch with the tow vehicle's receiver hitch. The processor may be further configured to receive alignment data from the alignment sensors and the position sensors. The processor may further determine a tow vehicle path based on the alignment data and communicate the tow vehicle path to at least one of the user and the vehicle control system, thereby prompting adjustments to at least one of the tow vehicle path and tow vehicle acceleration.

In an embodiment, the system may operate when the trailer is a boat trailer, and the tow vehicle and trailer may be backing up in a reverse direction travelling towards a boat launch.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIG. 1A is an illustration depicting a truck pulling a flat-bed trailer.

FIG. 1B is an illustration depicting a truck pulling a camp trailer.

FIG. 2A is an illustration depicting a specific truck pulling a flatbed trailer.

FIG. 2B shows a cloud network communicating via a wireless signal.

FIG. 2C illustrates a mobile app on a mobile device.

FIG. 2D is an illustration of a wireless hub.

DETAILED DESCRIPTION

Figure 1C:
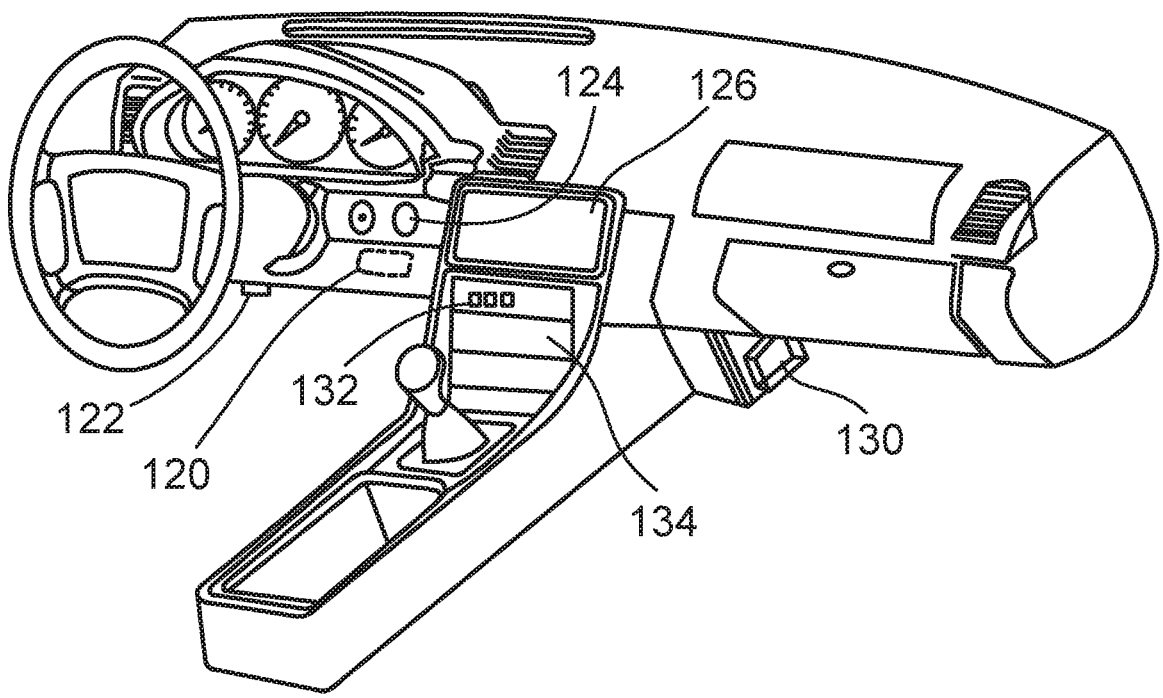
FIG. 1C is an illustration depicting a car dashboard, steering wheel and shifter.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

"Safety Parameters" referred to throughout this document refer to parameters established to assure safe travel of the tow vehicle and trailer along a defined path. Safety parameters may be factory presets that apply to the tow vehicle and trailer. These safety parameters may define load ratings for the tow vehicle and trailer for example. If an overload condition is determined by the weight determination system, the system may alert the user and the vehicle control system. Adjustments to the weight may then be made in order to bring the weight into compliance with the ratings.

Other safety parameters may be entered into the system by a user. Safety Parameters may also include guidelines determined by the system regarding safe travel along a path. For example, a safety parameter regarding roadway surface condition may determine that a section of roadway is slick (based on sensor data) and alert the vehicle control system to reduce the speed of the tow vehicle and trailer to a lower safer speed. These parameters may include the speed of the tow vehicle and trailer and the acceleration of the tow vehicle.

Weather reports may also be included in the safety parameters, defining timing of travel along a given roadway, making modifications to a route plan for example in order to avoid a storm coming through an area.

Obstructions along the roadway or near the roadway may also be reported to the system to confirm that they are within the safety parameters established for a given path approach. For example, the system may require a minimum of 12 inches of clearance from any curb when going around a corner. This safety parameter may be communicated to the vehicle control system to assure that a given turn may be carried out safely, without the off-tracking of the trailer causing the trailer to go over a curb.

Automatic Moving Truck and Trailers (AMTT)

The AMTT enables an autonomous vehicle such as an autonomous moving truck to pull a trailer safely. The AMTT automatically senses the length of a trailer, along with the location and type of trailer hitch. The pivot point (such as the ball joint on a truck) that connects to the trailer hitch is also known or determined by the AMTT, and communicated to the control system of an autonomous vehicle.

The AMTT determines the hitch type and location either directly, by one or more cameras (mounted on vehicle or trailer), by sensors, or may be determined or learned by the behavior of the trailer once it has been connected (based on trailer weight, mass sensing and drag). Once the pivot point and hitch are both known, the AMTT guides the control system of an autonomous vehicle during the driving forward and backing up of the vehicle by sending commands to the control system. The AMTT further comprises an on-board weight determination system that determines tow vehicle weight and trailer weight. The AMTT may be summoned by an app on a mobile device to send an autonomous vehicle to connect to a trailer and bring it to a user's location. The AMTT may further send commands to the control system of an autonomous vehicle, instructing it to tow the trailer to a desired destination and park the trailer.

People who need to move items have to reserve and drive (or have someone drop them off) at a rental center. After use, they have to repeat the process. For many trips, this time and effort is more work than the move itself. In addition, many do it yourselfers are unfamiliar with trucks and trailers, so renting these items is intimidating, and dangerous.

The length of the trailer influences the process of backing up. Short trailers are more sensitive to changes in the angle or pitch of the trailer with respect to the tow vehicle, and can jack knife very quickly if care is not taken to make necessary adjustments while steering the vehicle.

In addition to potential problems while backing up a trailer, even the forward motion of a vehicle towing a trailer may present possible hazards. Towing a trailer of unknown length and weight may cause a condition known as off-tracking. Due to their size and weight, vehicles pulling trailers are challenging to operate safely in traffic. Off-tracking may cause drivers of a vehicle towing a trailer difficulty in negotiating turns. Off-tracking is when the rear wheels of the trailer travel in a different path around turns and curves than the front wheels do, an effect that frequently results in accidents. Because this is a known effect, truck wreck attorneys maintain that it is the truck driver's responsibility to prevent accidents through careful driving and negotiation of turns.

Off-tracking is when a Longer Combination Vehicle (LCV) like a tractor trailer makes a turn or negotiates a ramp, and the rear wheels of the trailer end up driving in a different path than the tractor and the front wheels of the trailer. This happens in conditions where there is not enough space for the driver to make a wide turn that prevents off-tracking, such as turning on city streets or tight highway on ramp curves. Trailers that off-track usually run over curbs when turning to the right, and invade oncoming traffic lanes when turning to the left. Also, in these tighter situations, the longer the trailer, or combination of trailers, the greater the amount of off-tracking.

Off-tracking is a common cause of accidents that range from minor to severe. The usual way that these occurrences happen is when trucks end up driving into other vehicles in their path, or sometimes even unsuspecting pedestrians. At slow speeds such as negotiating city streets this effect is known to cause many fender-bender type accidents, but when off-tracking happens at higher speeds, such as when negotiating a tight curve in the road or an on- or off-ramp, cars can be sideswiped by a truck's rear wheels, and a bigger, more dangerous accident can occur as a result.

Although it is impossible for autonomous tow vehicles to avoid off-tracking in many situations, especially when negotiating tight city streets, there are specific, and safe ways in which off-tracking should be handled. Most importantly, vehicles must drive slowly enough to carefully make turns, stopping if it seems they will run into other vehicles, pedestrians or objects along the side of the road. It is the duty of the control system of autonomous vehicles to yield to other traffic when it becomes obvious that the truck cannot make its turn without driving into the path of oncoming cars, or onto the sidewalk, and give those vehicles and people the chance to move out of the way.

In order to properly maneuver a trailer being towed, it is important to know the length of the trailer. Determining the limits for hitch angle (position of trailer with respect to the tow vehicle) is necessary to determine the extent of off-tracking, and to prevent jack knifing.

The length of the trailer must be known in order to properly determine allowable hitch angles. Jackknifing during backing up of trailers occurs when the hitch angle increases to a point such that the vehicle and trailer fold together about the hitch point like a jackknife. If the backward motion is continued, the jackknife effect progressively worsens, until the vehicle and trailer are in physical contact with each other. Jackknifing can result in traffic disruptions and wasted time, and can potentially cause damage or personal injury. The AMTT determines trailer length, and in certain embodiments may also analytically determine the 'critical hitch angle' ($\theta cr$), the hitch angle threshold beyond which a continued reverse motion causes an inescapable jackknifing.

The AMTT may also, in other embodiments, provide a formal definition of $\theta cr$ for slow backing up of vehicle-trailer systems on a level solid surface, beyond which the vehicle must stop backing up and revert to forward motion in order to escape from jackknifing. The critical hitch angle is sub-categorised into Absolute ($\theta cr$, a) and Directional ($\theta cr$, d) critical hitch angles depending on the operating constraints and vehicle steering objectives. One solution for $\theta cr$ is posed as a numerical solution to the steady-state conditions of the dynamic equations. Also, a warning system making use of the θcr may also be implemented in an embodiment of the AMTT. Such warning system may assist autonomous vehicle control systems in avoiding jackknifing while backing up a vehicle-trailer system. In other embodiments the Absolute (θcr, a) and Directional (θcr, d) critical hitch angles may be provided to a semi-autonomous control system or autonomous control system in order to inform the operation of the tow vehicle.

The objectives of the Automatic Moving Truck and Trailers (AMTT) are to provide guidance to autonomous vehicles enabling the control system to pull a trailer, and to back up the trailer. The physical environment in the immediate area surrounding the tow vehicle and trailer are detected by cameras and sensors in order to establish safe operating parameters. Other objectives include determining allowable hitch angles, and not allowing the trailer to exceed critical angles creating a jackknife condition. Communicating operating parameters and critical angles to the control system of an autonomous vehicle are also required.

Further objectives include determining the length of a trailer being towed by a vehicle. The AMTT further enables adjustments to a vehicle's control settings to be made based on the length and weight of the trailer. The AMTT informs the control system of an autonomous vehicle regarding trailer length in order to allow better control while going forward (off-tracking) and while backing up (avoid jack knifing).

Another objective of the AMTT includes determining the hitch type and location either directly, by one or more cameras (mounted on vehicle or trailer), by sensors, or may be learned by the behavior of the trailer once it has been connected (based on trailer weight, mass sensing and drag). Once the hitch is known, the AMTT may guide the control system of an autonomous vehicle during the driving forward and backing up of the vehicle. The AMTT may further inform the control system of automatic hitching systems to engage and lock-in, or disengage the hitch as required for connecting or disconnecting a trailer from a tow vehicle.

Automatic Trailer Launching (AMTT) provides guidance to autonomous vehicles enabling the control system to drive forward and back up a trailer. The AMTT further provides guidance to autonomous vehicles enabling the control system to back up to a trailer, and connect to the trailer. Likewise, the AMTT enables the control system to disconnect a trailer and release the trailer from the autonomous vehicle once the trip is completed and the trailer has been stowed in a parking location.

The physical environment in the immediate area surrounding the tow vehicle and trailer are detected by cameras and sensors in order to establish safe operating parameters. The AMTT determines allowable hitch angles, and does not allow the trailer to exceed critical angles creating a jackknife condition. The AMTT communicates operating parameters and critical angles to the control system of an autonomous vehicle.

The AMTT includes determines the hitch type and location either directly, by one or more cameras (mounted on vehicle or trailer), by sensors, or may be learned by the behavior of the trailer once it has been connected (based on trailer weight, mass sensing and drag). Once the hitch is known, the AMTT may guide the control system of an autonomous vehicle during the backing up of the vehicle. Visual or audible alerts may be communicated to the user while the vehicle is backing up. The AMTT may further inform the control system of automatic hitching systems to engage and lock-in, or disengage the hitch as required for connecting or disconnecting a trailer from a tow vehicle.

The AMTT utilizes cameras, on-board sensors, and components to determine trailer length, trailer hitch type and location. The AMTT further comprises software, firmware, processors and controllers that enable the determination of trailer hitch angles based on tractrix involute curves. In some embodiments, the tractrix involute curves are utilized to describe the motion of the tow vehicle and trailer. Regression is used to solve for the distance from the pivot to the axle. Once this is known, the direction of travel of the trailer may be calculated for various curves. The AMTT continuously monitors actual angles determined by cameras and sensors, and compares the actual angles to predicted angles in order to refine and develop specific profiles based on specific vehicle and trailer set-ups.

The physical environment in the immediate area surrounding the tow vehicle and trailer are detected by cameras and sensors in order to establish safe operating parameters. The AMTT determines allowable hitch angles, and does not allow the trailer to exceed critical angles creating a jackknife condition. The AMTT communicates operating parameters and critical angles to the control system of an autonomous vehicle. This data along with vehicle and trailer configuration data is communicated to the processors or on-board computers that control the operation of the vehicle and systems related to hooking up a trailer. Information regarding trailer length, hitch location and weight is communicated in real-time, enabling real-time adjustments to be made to the vehicle as it is backing up to the trailer, and while it is backing up once the trailer has been connected to the tow vehicle.

The AMTT is responsive to absolute and directional critical hitch angles, sending trouble and warning signals when these critical angles are approached and exceeded. Zones may be identified for each set-up of vehicle and trailer to assure safe operation prior to reaching critical angles. One or more zones may be identified and be associated with a different control signal. For example, as the vehicle is backing up, a first zone may be indicated that is approaching a critical hitch angle so that the control system of an autonomous vehicle may respond by correcting the steering of the vehicle. If the correction is not enough to avoid progression towards a second zone (the second zone being closer to the critical angle), the AMTT may send a second signal indicating that the second zone has been reached. This allows the autonomous vehicle control system a range of opportunity to correct the steering and avoid reaching the critical angle.

These signals associated with the first zone and the second zone may also be visual or audible. Because of the distinctiveness and uniqueness of the one or more signals for the one or more zones, the control system may easily differentiate separate signals so that it is clear how to correct the steering.

The autonomous tow vehicle automatically drives to the location where the specified trailer is parked. The tow vehicle backs up to the trailer and connects to the hitch of the trailer, connecting it to the tow vehicle. The AMTT provides commands to the control system of the autonomous vehicle guiding the driving forward and backing up of the combined vehicle and trailer system.

The autonomous vehicle with trailer then proceeds to the user's home or designated loading location allowing equipment or boxes to be loaded onto the trailer or truck. After the trip is completed, the autonomous vehicle may first return the trailer to the rental location or to the designated (by user)

parking location. The vehicle may then disconnect the trailer from the tow vehicle. In some cases, this may be at a commercial trailer rental station.

Automated trucks and tow vehicles for trailers will allow users to hail a truck or trailer remotely via a mobile app. The truck or trailer would then show up at the user's location. The user could then fill the truck or trailer, and tell the vehicle where and when to be at the next location.

A rental company may send equipment to a user's location when requested by the user via an app. The AMTT informs the autonomous tow vehicle where to go to pick up the rental equipment once the request is received from the user or the rental company. The autonomous vehicle then drives to the rental company and backs up to the trailer with the requested equipment. The tow vehicle then connects the trailer and tows it to the user's location. The tow vehicle may then drop off the equipment for the user by parking a detaching the trailer. Once the user is finished using the equipment, the user may summon the tow vehicle to return via the AMTT mobile app.

The AMTT automatically senses the length of the trailer, from the pivot point to the axle. The angle of the trailer with respect to the tow vehicle is measured via: Rear view camera perception of the trailer vs. the road moving below. Ultra sonic sensors sensing distance to trailer, and therefore angle of trailer to tow vehicle. Radar, lidar, and other sensors to detect angle. Magnetometer, gyro's, and other sensors physically attached.

The AMTT automatically senses the length of the trailer, from the pivot point to the axle. The angle of the trailer with respect to the tow vehicle is measured via: cameras on vehicle or on trailer, rear view camera perception of the trailer vs. the road moving below while moving, ultra-sonic sensors sensing distance to trailer, and therefore angle of trailer to tow vehicle. Radar, lidar, and other sensors to detect angle. Magnetometer, gyro's, and other sensors physically attached. The trailer may include additional sensors such as attitude, pressure or other sensors that detect water depth.

By monitoring the trailers angular movement with respect to the tow vehicle, the distance from the pivot to the axle may be learned. This may occur by observing the front of the trailer, the truck with respect to the trailer, and the side of the trailer.

Tractrix involute curves are utilized to describe the motion of the tow vehicle and trailer. Regression is used to solve for the distance from the pivot to the axle. Once this is known, the off tracking may be calculated for various curves. Inputs into the function would include: Steering wheel angle sensor, wheel speed sensors, tow vehicle to angle sensing (camera, Infrared, Lidar, Radar, Ultra-sonic, Gyro, Magnetometer, etc.)

System can be a hub for the broader internet of towing. This system may communicate with fleet management systems, other vehicles, and other products on board the vehicle.

The AMTT consists of software and/or firmware and other equipment or systems that enable the hardware and systems in a vehicle to make adjustments to control systems within the vehicle.

The AMTT may include one or more of the following components:
 1. Software
 2. Firmware
 3. Hardware
 4. Sensors—electrical, electro-mechanical, automotive, chemical, navigational, thermal
 5. Magnetometer, gyro's, motion sensor, radar, lidar, proximity sensor, camera
 6. Accelerometers
 7. Processor
 8. Controller or microcontroller
 9. Memory or other data storage device or module
 10. Wireless network device
 11. Mobile device The basic process of how the AMTT is used or implemented is as follows:

A user opens the AMTT app on a mobile device (or app "on-board" vehicle for OEM implementation) that prompts the user to indicate equipment included in the system. If the equipment included is a trailer, for example, the user is prompted to indicate that the trailer is part of the system and to include the trailer and its hitch location. The user may manually enter data regarding this trailer data, or it may be determined automatically (for example—wirelessly via WIFI or other wireless communication devices).

In some embodiments, the trailer and its hitch location are recognized by the AMTT automatically so that no user interface is required. Cameras, proximity sensors, or other sensors on the trailer and tow vehicle may inform the AMTT regarding hitch configuration and location. The AMTT may determine trailer and hitch compatibility prior to a trailer hookup event. Once the trailer and hitch are known by the AMTT, the autonomous vehicle control system is prompted to begin backing up to the trailer. The AMTT instructs the control system of the autonomous vehicle and guides it to align the hitch with the pivot point (ball joint). The AMTT then sends a command to an automated hitch connector to make the connection of the hitch to the ball on the tow vehicle. Alternatively, the user may make this connection manually.

Information regarding hitch location is communicated in real-time, enabling real-time adjustments to be made while the vehicle is backing up. These adjustments may be made initially when the autonomous vehicle first starts driving based on pre-set data, or measured data made prior to a first trailer hookup event. As the vehicle begins a first trailer hookup event, the AMTT may monitor the trailer length and hitch location and make further adjustments to the trailer data based on the behavior of the system while hooking up the trailer.

In certain embodiments, a custom hookup profile may be developed by building a profile for each trailer hookup characteristic. For example, there may be a hookup profile called "trailer A" which comprises a hookup profile for a trailer with stabilizer hitch. In this case, the tow vehicle recognizes that "trailer A" requires additional hookup requirements (connecting the stabilizer arms) in addition to the hitch connection to the pivot point. In another example, a hookup profile "trailer B" may be for a fifth wheel trailer. In this example, the control system of the autonomous vehicle may be alerted that the trailer can not be connected to the tow vehicle. For example, a bumper hitch set-up will not work for a fifth wheel trailer. This info is communicated to the autonomous vehicle control system prior to the hookup event.

Since each case may require different settings for the control system, or other related systems based on the trailer type and hitch configuration, a unique profile may be stored in memory and used in the future for that same application. In this way, the "trailer A" profile may then be engaged every time the trailer is hooked up.

In addition to trailer and vehicle determination, the properties of the physical environment in the immediate area surrounding the tow vehicle and trailer are detected by cameras and sensors to establish safe operating parameters. The driveway the trailer is to be backed up into is identified prior to backing up. This may be done by identifying the desired driveway by a user. There may be an image displayed on the app identifying the approach or driveway. This may be selected by the user by touching a touchscreen in the location of the driveway. In some embodiments, the app may recognize both sides of the driveway, along with the stopping point that the trailer is to be backed up to. The app may highlight these parameters (right side, left side, and stopping point). The user may either accept the highlighted parameters, or slide along the touch screen in the appropriate direction to move or adjust these parameters if required.

The AMTT may use sensors and cameras to determine the characteristics of the driveway or parking spot and decide the best stopping point that allows the trailer to be boarded safely. Once this determination has been made, the user may be able to modify these parameters based on personal judgement. The AMTT may store these parameters for future use including a trailer profile, a tow vehicle and trailer profile, and a profile including one or more of the tow vehicle, the trailer and the driveway or parking spot. In this way, these parameters may be learned, calibrated and improved each time a trailer is backed up and each time equipment or other items are loaded onto the trailer.

In addition to the stopping point of the trailer, the parking location of the tow vehicle is also identified by the user during the determination phase. Prior to backing up, the user may identify the parking location of the autonomous vehicle. In some embodiments, the parking location is known for the autonomous vehicle based on the vehicle type and proximity to a loading zone or driveway location.

Other potential obstructions in the environment surrounding the drive approach are also detected by the AMTT and may be entered in the app by the user. For example, there may be a light pole on one side of the drive approach that is close to the desired drive path. Cameras and sensors establish this light pole as a potential obstruction so that the control system may "steer clear" of the obstruction. The drive path of both the trailer and the tow vehicle are analyzed for these obstructions, and similar zone alerts are issued based on how close the vehicle or trailer come to these obstructions. Similar alerts may be issued (may be unique and different alerts from the angle alerts) enabling the control system to make adjustments as required.

Obstructions are identified during the initial drive path identification phase (prior to backing up). In addition, the AMTT may also continuously monitor for obstructions during the back up phase. For example, a child may be playing in the vicinity, but not near the drive path during the path id phase. However, once the vehicle starts to move backwards, the child may move into one of the obstruction zones. In this case, the AMTT may immediately alert the control system to stop the vehicle.

The AMTT determines allowable hitch angles, and does not allow the trailer to exceed critical angles creating a jackknife condition. The AMTT communicates operating parameters and critical angles to the control system of an autonomous vehicle. This data along with vehicle and trailer configuration data is communicated to the processors or on-board computers that control the operation of the vehicle and systems related to hooking up a trailer. Information regarding trailer length, hitch location and weight is communicated in real-time, enabling real-time adjustments to be made to the vehicle as it is backing up the trailer.

The AMTT further comprises an on-board weight determination system which determines the weight of both the vehicle and the trailer. The AMTT continuously monitors the weight along with how the weight impacts the travel of the vehicle and the trailer. These characteristics are saved in a profile for each specific set-up of tow vehicle and trailer combination. This profile may be refined and calibrated based on this data. Established profiles such as these may also be used to estimate requirements for a similar tow vehicle and trailer set-up that is new and not yet known to the AMTT.

Feedback from adjustments made to various on-board control systems may be further detected by the AMTT in order to further refine and calibrate the settings and profiles. These profiles are stored in the memory of the AMTT and used to determine the appropriate settings for subsequent trailer hookup events. Every time the vehicle and trailer are hitched up, on-board sensors and cameras record the behavior of the operation of hooking up the trailer in order to inform that specific vehicle and trailer hookup profile.

The AMTT automatically senses the hitch of the trailer while the tow vehicle is backing up. The location of the trailer hitch with respect to the tow vehicle pivot point is measured via: Rear view camera perception of the trailer vs. the road moving below. Ultra-sonic sensors sensing distance to trailer and trailer hitch, and therefore angle of trailer to tow vehicle. Radar, lidar, and other sensors to detect angle. Magnetometer, gyro's, and other sensors that detect motion and weight of the vehicle and trailer may also be employed.

By monitoring the trailer's angular movement with respect to the tow vehicle, the distance from the pivot to the hitch may be learned. This may occur by the camera capturing images of the trailer hitch in real time as the vehicle is backing up. Distance and hitch location may then be determined.

As the vehicle is backing up, the AMTT may suggest that the control system of an autonomous vehicle adjust the speed or steering to assure the correct angle conforming to a required path of travel. In some embodiments, this may be done in real time and proactively—anticipating the required adjustments and recording the effect of these adjustments. Sensors may record the result of each adjustment and add this data to the profile for that specific set-up under those specific conditions. As the sensor data is reported, the AMTT may also make immediate adjustments that may influence the hitch angle and drive path in real-time.

Once the stopping point has been reached, the AMTT may notify the autonomous control system that the trailer is now in the correct position. In some embodiments, the AMTT may determine a change in the weight of the trailer once the passengers, luggage, and equipment are unloaded from the trailer. Once the stopping point has been established, a profile may be determined for that specific set-up. Each time the trailer is backed up and loaded or unloaded, the profile may be refined and further calibrated. Use input may also be accepted via a user interface such as a mobile device to further refine the calibration settings.

At the beginning of a trip, a command may be communicated to the AMTT by the user via an app to the autonomous vehicle control system commanding it to back up to the trailer and connect the tow vehicle to the trailer. Another command may be sent to the autonomous vehicle via the AMTT app instructing the autonomous vehicle to bring the now attached trailer to a designated loading zone or parking location. Once the passengers have boarded the trailer, the AMTT assures that the vehicle is able to tow the trailer in a safe manner. The AMTT communicates how weight, drag and trailer towing behavior such as off-tracking to the control system. The AMTT may select routes of travel that allow for safe off-tracking without encountering obstructions. In some cases, the AMTT may determine that an alternate route is better than a normal route in order to allow for this off-tracking.

At the end of a trip, the trailer may be released from the tow vehicle once the trailer has been parked and the identified stopping point has been reached. This release may be done either automatically by the AMTT as programmed or previously determined by the user, or it may require a "release" command from the control system. The app may prompt the user to push a button to release the trailer from the vehicle. The communication from the AMTT to the release mechanism may be wireless. The AMTT may send an "disconnect" command to a hitch that operates a mechanical release that physically disconnects the hitch from the ball on the tow vehicle. These are examples of commands that may be given to one or more trailer systems or products that may be compatible with the AMTT. The AMTT may further comprise one or more various control and wireless types and configurations as required, enabling it to communicate with these products and systems as required to allow operation of these products or systems by the AMTT.

The AMTT may also further comprise a hub for the broader internet of towing. The AMTT may communicate with fleet management systems, other vehicles, and other products on board the vehicle and on the trailer.

In certain embodiments, the AMTT may be implemented directly into the vehicle in a factory or OEM application. In other embodiments, the AMTT may be retrofitted to an existing vehicle. In a retrofit application, the AMTT may plug into the vehicle's OBD port to allow interface with the vehicle's control system. Alternatively, it may be connected wirelessly either via a wireless adapter to the OBD, or to other wireless interface devices that connect the AMTT to the vehicle's control systems.

The AMTT may also interface with autonomous or semi-autonomous vehicles, informing the control system regarding weight and the impact that weight has on the engine and other systems.

In certain embodiments, the AMTT may be implemented via a local network. The local network may comprise the engine, and all associated control systems that affect the operation of the engine and the vehicle. The AMTT may communicate weight and engine loading data to each of these systems. In certain embodiments, the AMTT may develop performance profiles based on adjustments made based on weight and engine loading. The AMTT may further monitor the performance of these systems based on the performance profile in order to calibrate and refine the settings.

In other embodiments, the AMTT may further comprise connection to a cloud network. For example, user profiles, drive mode profiles, vehicle profiles, and system settings may be stored and accessed via a connection to the cloud. This connection may be via wireless devices or transmitter and receivers. In some embodiments, both monitoring and control of the AMTT may also be done via the cloud.

A mobile device may also be used for a user interface with the AMTT. In some cases, the processor in a mobile device along with other AMTT components may be comprised within the mobile device, and the mobile device may interface with the vehicle via a wireless connection. The mobile device may allow for user data or changes to the factory presets to be entered in.

In another embodiment, the user interface with the AMTT may be via the vehicle's infotainment system or other interface device on the dashboard of the vehicle.

Automatic Travel Trailer Towing (ATTT)

The ATTT automatically senses the length of a travel trailer, along with the location and type of trailer hitch. The pivot point (such as the ball joint on a truck) that connects to the trailer hitch is also known or determined by the ATTT, and communicated to the control system of an autonomous vehicle. The ATTT determines the hitch type and location either directly, by one or more cameras (mounted on vehicle or trailer), by sensors, or may be determined or learned by the behavior of the trailer once it has been connected (based on trailer weight, mass sensing and drag). Once the pivot point and hitch are both known, the ATTT guides the control system of an autonomous vehicle during the driving forward and backing up of the vehicle by sending commands to the control system. The ATTT further comprises an on-board weight determination system that determines tow vehicle weight and trailer weight. The ATTT may be summoned by an app on a mobile device to send an autonomous vehicle to connect to a travel trailer and bring it to a passenger loading location. The ATTT may further send commands to the control system of an autonomous vehicle, instructing it to tow the travel trailer to a desired destination and park the travel trailer there.

Travel trailers are luxurious spaces that drivers haul to and from vacation spots. Unfortunately, while in transit, the travel trailers sit empty while the occupants crowd into the tow vehicle. For families that spend a lot of time in an RV, the driver must spend the time with eyes on the road, instead of doing more productive work or play. Tow vehicles could drive themselves to and from storage lots, dump and fill stations, etc. further enhancing the luxury. Also, RV hailing business's could share assets. User would call up the RV on a mobile app, and the RV would pick up the family for the weekend.

Automated vehicles will make the highways safe enough for travelers to "move about the cabin" on freeways. This will affect Travel trailer design, making large windows for viewing scenery while on journey. Also, an office where occupants can perform work while travelling, will allow everyone to play when the destination is reached.

The length of the trailer influences the process of backing up. Short trailers are more sensitive to changes in the angle or pitch of the trailer with respect to the tow vehicle, and can jack knife very quickly if care is not taken to make necessary adjustments while steering the vehicle.

In addition to potential problems while backing up a trailer, even the forward motion of a vehicle towing a trailer may present possible hazards. Towing a trailer of unknown length and weight may cause a condition known as off-tracking. Due to their size and weight, vehicles pulling trailers are challenging to operate safely in traffic. Off-tracking may cause drivers of a vehicle towing a trailer difficulty in negotiating turns. Off-tracking is when the rear wheels of the trailer travel in a different path around turns and curves than the front wheels do, an effect that frequently results in accidents. Because this is a known effect, truck wreck attorneys maintain that it is the truck driver's responsibility to prevent accidents through careful driving and negotiation of turns.

Off-tracking is when a Longer Combination Vehicle (LCV) like a tractor trailer makes a turn or negotiates a ramp, and the rear wheels of the trailer end up driving in a different path than the tractor and the front wheels of the trailer. This happens in conditions where there is not enough space for the driver to make a wide turn that prevents off-tracking, such as turning on city streets or tight highway on ramp curves. Trailers that off-track usually run over curbs when turning to the right, and invade oncoming traffic lanes when turning to the left. Also, in these tighter situations, the longer the trailer, or combination of trailers, the greater the amount of off-tracking.

Off-tracking is a common cause of accidents that range from minor to severe. The usual way that these occurrences happen is when trucks end up driving into other vehicles in their path, or sometimes even unsuspecting pedestrians. At slow speeds such as negotiating city streets this effect is known to cause many fender-bender type accidents, but when off-tracking happens at higher speeds, such as when negotiating a tight curve in the road or an on- or off-ramp, cars can be sideswiped by a truck's rear wheels, and a bigger, more dangerous accident can occur as a result.

Although it is impossible for autonomous tow vehicles to avoid off-tracking in many situations, especially when negotiating tight city streets, there are specific, and safe ways in which off-tracking should be handled. Most importantly, vehicles must drive slowly enough to carefully make turns, stopping if it seems they will run into other vehicles, pedestrians or objects along the side of the road. It is the duty of the control system of autonomous vehicles to yield to other traffic when it becomes obvious that the truck cannot make its turn without driving into the path of oncoming cars, or onto the sidewalk, and give those vehicles and people the chance to move out of the way.

In order to properly maneuver a trailer being towed, it is important to know the length of the trailer. Determining the limits for hitch angle (position of trailer with respect to the tow vehicle) is necessary to determine the extent of off-tracking, and to prevent jack knifing.

The length of the trailer must be known in order to properly determine allowable hitch angles. Jackknifing during backing up of trailers occurs when the hitch angle increases to a point such that the vehicle and trailer fold together about the hitch point like a jackknife. If the backward motion is continued, the jackknife effect progressively worsens, until the vehicle and trailer are in physical contact with each other. Jackknifing can result in traffic disruptions and wasted time, and can potentially cause damage or personal injury. The ABL determines trailer length, and in certain embodiments may also analytically determine the 'critical hitch angle' ($\theta cr$), the hitch angle threshold beyond which a continued reverse motion causes an inescapable jackknifing.

The ABL may also, in other embodiments, provide a formal definition of $\theta cr$ for slow backing up of vehicle-trailer systems on a level solid surface, beyond which the vehicle must stop backing up and revert to forward motion in order to escape from jackknifing. The critical hitch angle is sub-categorised into Absolute ($\theta cr$, a) and Directional ($\theta cr$, d) critical hitch angles depending on the operating constraints and vehicle steering objectives. One solution for $\theta cr$ is posed as a numerical solution to the steady-state conditions of the dynamic equations. Also, a warning system making use of the $\theta cr$ may also be implemented in an embodiment of the ABL. Such warning system may assist autonomous vehicle control systems in avoiding jackknifing while backing up a vehicle-trailer system. In other embodiments the Absolute ($\theta cr$, a) and Directional ($\theta cr$, d) critical hitch angles may be provided to a semi-autonomous control system or autonomous control system in order to inform the operation of the tow vehicle.

The objectives of the Automatic Travel Trailer Towing (ATTT) are to provide guidance to autonomous vehicles enabling the control system to pull a travel trailer, and to back up the travel trailer. The physical environment in the immediate area surrounding the tow vehicle and trailer are detected by cameras and sensors in order to establish safe operating parameters. Other objectives include determining allowable hitch angles, and not allowing the trailer to exceed critical angles creating a jackknife condition. Communicating operating parameters and critical angles to the control system of an autonomous vehicle are also required.

Further objectives include determining the length of a trailer being towed by a vehicle. The ATTT further enables adjustments to a vehicle's control settings to be made based on the length and weight of the trailer. The ATTT informs the control system of an autonomous vehicle regarding trailer length in order to allow better control while going forward (off-tracking) and while backing up (avoid jack knifing).

Another objective of the ATTT includes determining the hitch type and location either directly, by one or more cameras (mounted on vehicle or trailer), by sensors, or may be learned by the behavior of the trailer once it has been connected (based on trailer weight, mass sensing and drag). Once the hitch is known, the ATTT may guide the control system of an autonomous vehicle during the driving forward and backing up of the vehicle.

Automatic Travel Trailer Launching (ATTT) provides guidance to autonomous vehicles enabling the control system to drive forward and back up a trailer. The ATTT further provides guidance to autonomous vehicles enabling the control system to back up to a trailer, and connect to the trailer. Likewise, the ATTT enables the control system to disconnect a trailer and release the trailer from the autonomous vehicle once the trip is completed and the trailer has been stowed in a parking location.

The physical environment in the immediate area surrounding the tow vehicle and trailer are detected by cameras and sensors in order to establish safe operating parameters. The ATTT determines allowable hitch angles, and does not allow the trailer to exceed critical angles creating a jackknife condition. The ATTT communicates operating parameters and critical angles to the control system of an autonomous vehicle.

The ATTT includes determines the hitch type and location either directly, by one or more cameras (mounted on vehicle or trailer), by sensors, or may be learned by the behavior of the trailer once it has been connected (based on trailer weight, mass sensing and drag). Once the hitch is known, the ATTT may guide the control system of an autonomous vehicle during the backing up of the vehicle. Visual or audible alerts may be communicated to the user while the vehicle is backing up.

The ATTT utilizes cameras, on-board sensors, and components to determine trailer length, trailer hitch type and location. The ATTT further comprises software, firmware, processors and controllers that enable the determination of trailer hitch angles based on tractrix involute curves. In some embodiments, the tractrix involute curves are utilized to describe the motion of the tow vehicle and trailer. Regression is used to solve for the distance from the pivot to the axle. Once this is known, the direction of travel of the trailer may be calculated for various curves. The ATTT continuously monitors actual angles determined by cameras and sensors, and compares the actual angles to predicted angles in order to refine and develop specific profiles based on specific vehicle and trailer set-ups.

The physical environment in the immediate area surrounding the tow vehicle and trailer are detected by cameras and sensors in order to establish safe operating parameters. The ATTT determines allowable hitch angles, and does not allow the trailer to exceed critical angles creating a jackknife condition. The ATTT communicates operating parameters and critical angles to the control system of an autonomous vehicle. This data along with vehicle and trailer configuration data is communicated to the processors or on-board computers that control the operation of the vehicle and systems related to hooking up a trailer. Information regarding trailer length, hitch location and weight is communicated in real-time, enabling real-time adjustments to be made to the vehicle as it is backing up to the trailer, and while it is backing up once the trailer has been connected to the tow vehicle.

The ATTT is responsive to absolute and directional critical hitch angles, sending trouble and warning signals when these critical angles are approached and exceeded. Zones may be identified for each set-up of vehicle and trailer to assure safe operation prior to reaching critical angles. One or more zones may be identified and be associated with a different control signal. For example, as the vehicle is backing up, a first zone may be indicated that is approaching a critical hitch angle so that the control system of an autonomous vehicle may respond by correcting the steering of the vehicle. If the correction is not enough to avoid progression towards a second zone (the second zone being closer to the critical angle), the ATTT may send a second signal indicating that the second zone has been reached. This allows the autonomous vehicle control system a range of opportunity to correct the steering and avoid reaching the critical angle.

These signals associated with the first zone and the second zone may also be visual or audible. Because of the distinctiveness and uniqueness of the one or more signals for the one or more zones, the control system may easily differentiate separate signals so that it is clear how to correct the steering.

The autonomous tow vehicle automatically drives to the location where the specified travel trailer is parked. The tow vehicle backs up to the travel trailer and connects to the hitch of the trailer, connecting it to the tow vehicle. The ATTT provides commands to the control system of the autonomous vehicle guiding the driving forward and backing up of the combined vehicle and trailer system.

The autonomous vehicle with trailer then proceeds to the user's home or designated boarding location allowing the passengers and user to board the vehicle. After the trip in the travel trailer is completed, the autonomous vehicle may first return the passengers to the home or boarding location and drop them off. The vehicle may then return the trailer to the specified parking location and disconnect from the trailer. In some cases, this may be at a commercial travel trailer rental station.

The ATTT automatically senses the length of the trailer, from the pivot point to the axle. The angle of the trailer with respect to the tow vehicle is measured via: cameras on vehicle or on trailer, rear view camera perception of the trailer vs. the road moving below while moving, ultra-sonic sensors sensing distance to trailer, and therefore angle of trailer to tow vehicle. Radar, lidar, and other sensors to detect angle. Magnetometer, gyro's, and other sensors physically attached. The trailer may include additional sensors such as attitude, pressure or other sensors that detect water depth.

By monitoring the trailers angular movement with respect to the tow vehicle, the distance from the pivot to the axle may be learned. This may occur by observing the front of the trailer, the truck with respect to the trailer, and the side of the trailer.

Tractrix involute curves are utilized to describe the motion of the tow vehicle and trailer. Regression is used to solve for the distance from the pivot to the axle. Once this is known, the off tracking may be calculated for various curves. Inputs into the function would include: Steering wheel angle sensor, wheel speed sensors, tow vehicle to angle sensing (camera, Infrared, Lidar, Radar, Ultra-sonic, Gyro, Magnetometer, etc.)

System can be a hub for the broader internet of towing. This system may communicate with fleet management systems, other vehicles, and other products on board the vehicle.

Main Components

The ATTT consists of software and/or firmware and other equipment or systems that enable the hardware and systems in a vehicle to make adjustments to control systems within the vehicle.

The ATTT may include one or more of the following components:
1. Software
2. Firmware
3. Hardware
4. Camera
5. Sensors—electrical, electro-mechanical, automotive, chemical, navigational, thermal
6. Magnetometer, gyro's, motion sensor, radar, lidar, proximity sensor
7. Accelerometers
8. Processor
9. Controller or microcontroller
10. Memory or other data storage device or module
11. Wireless network device
12. Mobile device The basic process of how the ATTT is used or implemented is as follows:

A user opens the ATTT app on a mobile device (or app "on-board" vehicle for OEM implementation) that prompts the user to indicate equipment included in the system. If the equipment included is a travel trailer, for example, the user is prompted to indicate that the trailer is part of the system and to include the trailer and its hitch location. The user may manually enter data regarding this trailer data, or it may be determined automatically (for example—wirelessly via WIFI or other wireless communication devices).

In some embodiments, the trailer and its hitch location are recognized by the ATTT automatically so that no user interface is required. Cameras, proximity sensors, or other sensors on the trailer and tow vehicle may inform the ATTT regarding hitch configuration and location. The ATTT may determine trailer and hitch compatibility prior to a trailer hookup event. Once the trailer and hitch are known by the ATTT, the autonomous vehicle control system is prompted to begin backing up the tow vehicle.

Information regarding hitch location is communicated in real-time, enabling real-time adjustments to be made while the vehicle is backing up. These adjustments may be made initially when the autonomous vehicle first starts driving based on pre-set data, or measured data made prior to a first trailer hookup event. As the vehicle begins a first trailer hookup event, the ATTT may monitor the trailer length and hitch location and make further adjustments to the trailer data based on the behavior of the system while hooking up the trailer.

In certain embodiments, a custom hookup profile may be developed by building a profile for each trailer hookup characteristic. For example, there may be a hookup profile called "trailer A" which comprises a hookup profile for a trailer with stabilizer hitch. In this case, the tow vehicle recognizes that "trailer A" requires additional hookup requirements (connecting the stabilizer arms) in addition to the hitch connection to the pivot point. In another example, a hookup profile "trailer B" may be for a fifth wheel trailer. In this example, the control system of the autonomous vehicle may be alerted that the trailer can not be connected to the tow vehicle. For example, a bumper hitch set-up will not work for a fifth wheel trailer. This info is communicated to the autonomous vehicle control system prior to the hookup event.

Since each case may require different settings for the control system, or other related systems based on the trailer type and hitch configuration, a unique profile may be stored in memory and used in the future for that same application. In this way, the "trailer A" profile may then be engaged every time the trailer is hooked up.

In addition to trailer and vehicle determination, the properties of the physical environment in the immediate area surrounding the tow vehicle and trailer are detected by cameras and sensors to establish safe operating parameters. The driveway the trailer is to be backed up into is identified prior to backing up. This may be done by identifying the desired driveway by a user. There may be an image displayed on the app identifying the approach or driveway. This may be selected by the user by touching a touchscreen in the location of the driveway. In some embodiments, the app may recognize both sides of the driveway, along with the stopping point that the trailer is to be backed up to. The app may highlight these parameters (right side, left side, and stopping point). The user may either accept the highlighted parameters, or slide along the touch screen in the appropriate direction to move or adjust these parameters if required.

The ATTT may use sensors and cameras to determine the characteristics of the driveway or parking spot and decide the best stopping point that allows the trailer to be boarded safely. Once this determination has been made, the user may be able to modify these parameters based on personal judgement. The ATTT may store these parameters for future use including a trailer profile, a tow vehicle and trailer profile, and a profile including one or more of the tow vehicle, the trailer and the driveway or parking spot. In this way, these parameters may be learned, calibrated and improved each time a trailer is backed up and each time passengers load onto the travel trailer.

In addition to the stopping point of the trailer, the parking location of the tow vehicle is also identified by the user during the determination phase. Prior to backing up, the user may identify the parking location of the autonomous vehicle. In some embodiments, the parking location is known for the autonomous vehicle based on the vehicle type and proximity to a loading zone or driveway location.

Other potential obstructions in the environment surrounding the drive approach are also detected by the ATTT and may be entered in the app by the user. For example, there may be a light pole on one side of the drive approach that is close to the desired drive path. Cameras and sensors establish this light pole as a potential obstruction so that the control system may "steer clear" of the obstruction. The drive path of both the trailer and the tow vehicle are analyzed for these obstructions, and similar zone alerts are issued based on how close the vehicle or trailer come to these obstructions. Similar alerts may be issued (may be unique and different alerts from the angle alerts) enabling the control system to make adjustments as required.

Obstructions are identified during the initial drive path identification phase (prior to backing up). In addition, the ATTT may also continuously monitor for obstructions during the back up phase. For example, a child may be playing in the vicinity, but not near the drive path during the path id phase. However, once the vehicle starts to move backwards, the child may move into one of the obstruction zones. In this case, the ATTT may immediately alert the control system to stop the vehicle.

The ATTT determines allowable hitch angles, and does not allow the trailer to exceed critical angles creating a jackknife condition. The ATTT communicates operating parameters and critical angles to the control system of an autonomous vehicle. This data along with vehicle and trailer configuration data is communicated to the processors or on-board computers that control the operation of the vehicle and systems related to hooking up a trailer. Information regarding trailer length, hitch location and weight is communicated in real-time, enabling real-time adjustments to be made to the vehicle as it is backing up the trailer.

The ATTT further comprises an on-board weight determination system which determines the weight of both the vehicle and the trailer. The ATTT continuously monitors the weight along with how the weight impacts the travel of the vehicle and the trailer. These characteristics are saved in a profile for each specific set-up of tow vehicle and trailer combination. This profile may be refined and calibrated based on this data. Established profiles such as these may also be used to estimate requirements for a similar tow vehicle and trailer set-up that is new and not yet known to the ATTT.

Feedback from adjustments made to various on-board control systems may be further detected by the ATTT in order to further refine and calibrate the settings and profiles. These profiles are stored in the memory of the ATTT and used to determine the appropriate settings for subsequent trailer hookup events. Every time the vehicle and trailer are hitched up, on-board sensors and cameras record the behavior of the operation of hooking up the trailer in order to inform that specific vehicle and trailer hookup profile.

The ATTT automatically senses the hitch of the trailer while the tow vehicle is backing up. The location of the trailer hitch with respect to the tow vehicle pivot point is measured via: Rear view camera perception of the trailer vs. the road moving below. Ultra-sonic sensors sensing distance to trailer and trailer hitch, and therefore angle of trailer to tow vehicle. Radar, lidar, and other sensors to detect angle. Magnetometer, gyro's, and other sensors that detect motion and weight of the vehicle and trailer may also be employed.

By monitoring the trailer's angular movement with respect to the tow vehicle, the distance from the pivot to the hitch may be learned. This may occur by the camera capturing images of the trailer hitch in real time as the vehicle is backing up. Distance and hitch location may then be determined.

As the vehicle is backing up, the ATTT may suggest that the control system of an autonomous vehicle adjust the speed or steering to assure the correct angle conforming to a required path of travel. In some embodiments, this may be done in real time and proactively—anticipating the required adjustments and recording the effect of these adjustments. Sensors may record the result of each adjustment and add this data to the profile for that specific set-up under those specific conditions. As the sensor data is reported, the ATTT may also make immediate adjustments that may influence the hitch angle and drive path in real-time.

Once the stopping point has been reached, the ATTT may notify the autonomous control system that the trailer is now in the correct position. In some embodiments, the ATTT may determine a change in the weight of the trailer once the passengers, luggage, and equipment are unloaded from the travel trailer. Once the stopping point has been established, a profile may be determined for that specific set-up. Each time the trailer is backed up and loaded or unloaded, the profile may be refined and further calibrated. Use input may also be accepted via a user interface such as a mobile device to further refine the calibration settings.

At the beginning of a trip, a command may be communicated to the ATTT by the user via an app to the autonomous vehicle control system commanding it to back up to the travel trailer and connect the tow vehicle to the trailer. Another command may be sent to the autonomous vehicle via the ATTT app instructing the autonomous vehicle to bring the now attached travel trailer to a designated loading zone or parking location. Once the passengers have boarded the travel trailer, the ATTT assures that the vehicle is able to tow the travel trailer in a safe manner. The ATTT communicates how weight, drag and trailer towing behavior such as off-tracking to the control system. The ATTT may select routes of travel that allow for safe off-tracking without encountering obstructions. In some cases, the ATTT may determine that an alternate route is better than a normal route in order to allow for this off-tracking.

At the end of a trip, the trailer may be released from the tow vehicle once the trailer has been parked and the identified stopping point has been reached. This release may be done either automatically by the ATTT as programmed or previously determined by the user, or it may require a "release" command from the control system. The app may prompt the user to push a button to release the trailer from the vehicle. The communication from the ATTT to the release mechanism may be wireless. The ATTT may send an "disconnect" command to a hitch that operates a mechanical release that physically disconnects the hitch from the ball on the tow vehicle. These are examples of commands that may be given to one or more trailer systems or products that may be compatible with the ATTT. The ATTT may further comprise one or more various control and wireless types and configurations as required, enabling it to communicate with these products and systems as required to allow operation of these products or systems by the ATTT.

The ATTT may also further comprise a hub for the broader internet of towing. The ATTT may communicate with fleet management systems, other vehicles, and other products on board the vehicle and on the trailer.

In certain embodiments, the ATTT may be implemented directly into the vehicle in a factory or OEM application. In other embodiments, the ATTT may be retrofitted to an existing vehicle. In a retrofit application, the ATTT may plug into the vehicle's OBD port to allow interface with the vehicle's control system. Alternatively, it may be connected wirelessly either via a wireless adapter to the OBD, or to other wireless interface devices that connect the ATTT to the vehicle's control systems.

The ATTT may also interface with autonomous or semi-autonomous vehicles, informing the control system regarding weight and the impact that weight has on the engine and other systems.

In certain embodiments, the ATTT may be implemented via a local network. The local network may comprise the engine, and all associated control systems that affect the operation of the engine and the vehicle. The ATTT may communicate weight and engine loading data to each of these systems. In certain embodiments, the ATTT may develop performance profiles based on adjustments made based on weight and engine loading. The ATTT may further monitor the performance of these systems based on the performance profile in order to calibrate and refine the settings.

In other embodiments, the ATTT may further comprise connection to a cloud network. For example, user profiles, drive mode profiles, vehicle profiles, and system settings may be stored and accessed via a connection to the cloud. This connection may be via wireless devices or transmitter and receivers. In some embodiments, both monitoring and control of the ATTT may also be done via the cloud.

A mobile device may also be used for a user interface with the ATTT. In some cases, the processor in a mobile device along with other ATTT components may be comprised within the mobile device, and the mobile device may interface with the vehicle via a wireless connection. The mobile device may allow for user data or changes to the factory presets to be entered in.

In another embodiment, the user interface with the ATTT may be via the vehicle's infotainment system or other interface device on the dashboard of the vehicle.

Auto Trailer Detection and Hookup (ATDH)

The ATDH automatically senses the length of a trailer, along with the location and type of trailer hitch. The pivot point (such as the ball joint on a truck) that connects to the trailer hitch is also known or determined by the ATDH, and communicated to the driver of the vehicle and to the control system of an autonomous vehicle. The ATDH determines the hitch type and location either directly, by one or more cameras (mounted on vehicle or trailer), by sensors, or may be determined or learned by the behavior of the trailer once it has been connected (based on trailer weight, mass sensing and drag). Once the pivot point and hitch are both known, the ATDH may guide the driver or the control system of an autonomous vehicle during the backing up of the vehicle. Visual or audible alerts may be communicated to the driver guiding the steering of the vehicle along with when to stop once the hitch has been aligned with the ball joint properly.

Backing up a tow vehicle to attach to a trailer can be difficult. In most cases it is only possible to align the trailer hitch with the ball on the back of a truck by having two people: the first person driving the truck and a second person standing near the trailer and guiding the driver with hand signals. The second person has a vantage point allowing them to actual visually check the alignment of the hitch with the ball. Without a second person to guide this process, the driver must guess and try to get as close as possible, then get out of the truck to visually check. After the visual check it may still take several times to get it properly aligned.

The objectives of the Trailer Length Determination (ATDH) are to determine the location and type of hitch on a trailer, and then communicate this to the driver of the vehicle and to the control system of an autonomous vehicle. The ATDH determines the hitch type and location either directly, by one or more cameras (mounted on vehicle or trailer), by sensors, or may be determined or learned by the behavior of the trailer once it has been connected (based on trailer weight, mass sensing and drag). Once the hitch is known, the ATDH may guide the driver or the control system of an autonomous vehicle during the backing up of the vehicle. Visual or audible alerts may be communicated to the driver guiding the steering of the vehicle along with when to stop once the hitch has been aligned properly.

The ATDH utilizes on-board sensors and equipment to determine trailer length and trailer hitch type and location. This data is communicated to the driver and the control system of an autonomous vehicle. This data along with vehicle and trailer configuration data is communicated to the processors or on-board computers that control the operation of the vehicle and systems related to hooking up a trailer. Information regarding trailer length, hitch location and weight is communicated in real-time, enabling real-time adjustments to be made to the vehicle as it is backing up towards the hitch of the trailer.

The ATDH consists of software and/or firmware and other equipment or systems that enable the hardware and systems in a vehicle to make adjustments to control systems within the vehicle.

The ATDH may include one or more of the following components:
1. Software
2. Firmware
3. Hardware
4. Sensors—electrical, electro-mechanical, automotive, chemical, navigational, thermal
5. Magnetometer, gyro's, motion sensor, radar, lidar, proximity sensor, camera
6. Accelerometers
7. Processor
8. Controller or microcontroller
9. Memory or other data storage device or module
10. Wireless network device
11. Mobile device The basic process of how the ATDH is used or implemented is as follows:

A user opens the ATDH app on a mobile device (or app "on-board" vehicle for OEM implementation) that prompts the user to indicate equipment included in the system. If the equipment included is a trailer, for example, the user is prompted to indicate that the trailer is part of the system and to include the trailer and its hitch location. The user may manually enter data regarding this trailer data, or it may be determined automatically (for example—wirelessly via WIFI or other wireless communication devices).

In some embodiments, the trailer and its hitch location are recognized by the ATDH automatically so that no user interface is required. Cameras, proximity sensors, or other sensors on the trailer and tow vehicle may inform the ATDH regarding hitch configuration and location. The ATDH may determine trailer and hitch compatibility prior to a trailer hookup event. Once the trailer and hitch are known by the ATDH, the driver or autonomous control system is prompted to begin backing up the tow vehicle.

Information regarding hitch location is communicated in real-time, enabling real-time adjustments to be made while the vehicle is backing up. These adjustments may be made initially when the driver first starts driving the vehicle based on pre-set data, or measured data made prior to a first trailer hookup event. As the vehicle begins a first trailer hookup event, the ATDH may monitor the trailer length and hitch location and make further adjustments to the trailer data based on the behavior of the system while hooking up the trailer.

In some embodiments, a custom hookup profile may be developed by building a profile for each trailer hookup characteristic. For example, there may be a hookup profile called "trailer A" which comprises a hookup profile for a trailer with stabilizer hitch. In this case, the tow vehicle recognizes that "trailer A" requires additional hookup requirements (connecting the stabilizer arms) in addition to the hitch connection to the pivot point. In another example, a hookup profile "trailer B" may be for a fifth wheel trailer. In this example, the control system of the autonomous vehicle, or the driver may be alerted that the trailer can not be connected to the tow vehicle. For example, a bumper hitch set-up will not work for a fifth wheel trailer. This info is communicated to the driver or autonomous control system prior to the hookup event.

Since each case may require different settings for the control system, or other related systems based on the trailer type and hitch configuration, a unique profile may be stored in memory and used in the future for that same application. In this way, the "trailer A" profile may then be engaged every time the trailer is hooked up.

Feedback from adjustments made to various on-board control systems may be further detected by the ATDH in order to further refine and calibrate the settings and profiles. These profiles are stored in the memory of the ATDH and used to determine the appropriate settings for subsequent trailer hookup events. Every time the vehicle and trailer are hitched up, on-board sensors and cameras record the behavior of the operation of hooking up the trailer in order to inform that specific vehicle and trailer hookup profile.

The ATDH automatically senses the hitch of the trailer while the tow vehicle is backing up. The location of the trailer hitch with respect to the tow vehicle pivot point is measured via: Rear view camera perception of the trailer vs. the road moving below. Ultra-sonic sensors sensing distance to trailer and trailer hitch, and therefore angle of trailer to tow vehicle. Radar, lidar, and other sensors to detect angle. Magnetometer, gyro's, and other sensors that detect motion and weight of the vehicle and trailer may also be employed.

By monitoring the trailer's angular movement with respect to the tow vehicle, the distance from the pivot to the hitch may be learned. This may occur by the camera capturing images of the trailer hitch in real time as the vehicle is backing up. Distance and hitch location may then be determined.

As the vehicle is backing up, the ATDH may suggest that the driver (via audible and/or visual alerts), make adjustments to the speed or steering to align the pivot with the hitch. The ATDH may also report this info to the control system of an autonomous vehicle. In some embodiments, this may be done in real time and proactively—anticipating the required adjustments and recording the effect of these adjustments. Sensors may record the result of each adjustment and add this data to the profile for that specific set-up under those specific conditions. As the sensor data is reported, the ATDH may also make immediate adjustments that may influence the alignment of the vehicle pivot point with the trailer hitch in real-time. Once the pivot and hitch are aligned the ATDH may notify the driver or autonomous control system that the hitch is aligned. In some embodiments, the ATDH may further inform an automatic hitch attachment system to engage the hitch and lock it in. Once the hitch is attached and locked in the ATDH may inform the driver and autonomous control system that the trailer is attached and ready to go. In some embodiments, the ATDH may further inform automatic support stand retraction devices to retract support legs, or automatic stabilizer hitch systems to attach the stabilizer mechanisms.

The ATDH may also further comprise a hub for the broader internet of towing. The ATDH may communicate with fleet management systems, other vehicles, and other products on board the vehicle and on the trailer.

In certain embodiments, the ATDH may be implemented directly into the vehicle in a factory or OEM application. In other embodiments, the ATDH may be retrofitted to an existing vehicle. In a retrofit application, the ATDH may plug into the vehicle's OBD port to allow interface with the vehicle's control system. Alternatively, it may be connected wirelessly either via a wireless adapter to the OBD, or to other wireless interface devices that connect the ATDH to the vehicle's control systems.

The ATDH may also interface with autonomous or semi-autonomous vehicles, informing the control system regarding weight and the impact that weight has on the engine and other systems.

In certain embodiments, the ATDH may be implemented via a local network. The local network may comprise the engine, and all associated control systems that affect the operation of the engine and the vehicle. The ATDH may communicate weight and engine loading data to each of these systems. In certain embodiments, the ATDH may develop performance profiles based on adjustments made based on weight and engine loading. The ATDH may further monitor the performance of these systems based on the performance profile in order to calibrate and refine the settings.

In other embodiments, the ATDH may further comprise connection to a cloud network. For example, user profiles, drive mode profiles, vehicle profiles, and system settings may be stored and accessed via a connection to the cloud. This connection may be via wireless devices or transmitter and receivers. In some embodiments, both monitoring and control of the ATDH may also be done via the cloud.

A mobile device may also be used for a user interface with the ATDH. In some cases, the processor in a mobile device along with other ATDH components may be comprised within the mobile device, and the mobile device may interface with the vehicle via a wireless connection. The mobile device may allow for user data or changes to the factory presets to be entered in.

In another embodiment, the user interface with the ATDH may be via the vehicle's infotainment system or other interface device on the dashboard of the vehicle.

Automatic Boat Launching (ABL)

The ABL automatically senses the length of a trailer, along with the location and type of trailer hitch. The pivot point (such as the ball joint on a truck) that connects to the trailer hitch is also known or determined by the ABL, and communicated to the driver of the vehicle and to the control system of an autonomous vehicle. The ABL determines the hitch type and location either directly, by one or more cameras (mounted on vehicle or trailer), by sensors, or may be determined or learned by the behavior of the trailer once it has been connected (based on trailer weight, mass sensing and drag). Once the pivot point and hitch are both known, the ABL may guide the driver or the control system of an autonomous vehicle during the backing up of the vehicle. Visual or audible alerts may be communicated to the driver guiding the steering of the vehicle along with when to stop once the trailer has reached the desired stopping point.

The objectives of the Automatic Boat Launching (ABL) are to provide guidance to drivers and autonomous vehicles enabling the driver (or control system) to back up a boat trailer. The physical environment in the immediate area surrounding the tow vehicle and boat trailer are detected by cameras and sensors in order to establish safe operating parameters. Other objectives include determining allowable hitch angles, and not allowing the trailer to exceed critical angles creating a jackknife condition. Communicating operating parameters and critical angles to the driver of the vehicle and to the control system of an autonomous vehicle are also required.

Another objective of the ABL includes determining the hitch type and location either directly, by one or more cameras (mounted on vehicle or trailer), by sensors, or may be learned by the behavior of the trailer once it has been connected (based on trailer weight, mass sensing and drag). Once the hitch is known, the ABL may guide the driver or the control system of an autonomous vehicle during the backing up of the vehicle. Visual or audible alerts may be communicated to the driver guiding the steering of the vehicle along with when to stop once the hitch has been aligned properly.

Automatic Boat Launching (ABL) provides guidance to drivers and autonomous vehicles enabling the driver (or control system) to back up a boat trailer. The physical environment in the immediate area surrounding the tow vehicle and boat trailer are detected by cameras and sensors in order to establish safe operating parameters. The ABL determines allowable hitch angles, and does not allow the trailer to exceed critical angles creating a jackknife condition. The ABL communicates operating parameters and critical angles to the driver of the vehicle and to the control system of an autonomous vehicle.

The ABL includes determines the hitch type and location either directly, by one or more cameras (mounted on vehicle or trailer), by sensors, or may be learned by the behavior of the trailer once it has been connected (based on trailer weight, mass sensing and drag). Once the hitch is known, the ABL may guide the driver or the control system of an autonomous vehicle during the backing up of the vehicle.

Visual or audible alerts may be communicated to the driver guiding the steering of the vehicle along with when to stop once the hitch has been aligned properly.

The ABL utilizes cameras, on-board sensors, and components to determine trailer length, trailer hitch type and location. The ABL further comprises software, firmware, processors and controllers that enable the determination of trailer hitch angles based on tractrix involute curves. In some embodiments, the tractrix involute curves are utilized to describe the motion of the tow vehicle and trailer. Regression is used to solve for the distance from the pivot to the axle. Once this is known, the direction of travel of the trailer may be calculated for various curves. The ABL continuously monitors actual angles determined by cameras and sensors, and compares the actual angles to predicted angles in order to refine and develop specific profiles based on specific vehicle and trailer set-ups.

The physical environment in the immediate area surrounding the tow vehicle and boat trailer are detected by cameras and sensors in order to establish safe operating parameters. The ABL determines allowable hitch angles, and does not allow the trailer to exceed critical angles creating a jackknife condition. The ABL communicates operating parameters and critical angles to the driver of the vehicle and to the control system of an autonomous vehicle. This data along with vehicle and trailer configuration data is communicated to the processors or on-board computers that control the operation of the vehicle and systems related to hooking up a trailer. Information regarding trailer length, hitch location and weight is communicated in real-time, enabling real-time adjustments to be made to the vehicle as it is backing up the trailer.

The ABL is responsive to absolute and directional critical hitch angles, sending trouble and warning signals when these critical angles are approached and exceeded. Zones may be identified for each set-up of vehicle and trailer to assure safe operation prior to reaching critical angles. One or more zones may be identified and be associated with a different control signal. For example, as a driver is backing up, a first zone may be indicated that is approaching a critical hitch angle so that the driver (or the control system of an autonomous vehicle) may respond by correcting the steering of the vehicle. If the correction is not enough to avoid progression towards a second zone (the second zone being closer to the critical angle), the ABL may send a second signal indicating that the second zone has been reached. This allows the driver and the autonomous control system a range of opportunity to correct the steering and avoid reaching the critical angle.

These signals associated with the first zone and the second zone may be visual or audible. Because of the distinctiveness and uniqueness of the one or more signals for the one or more zones, the driver or control system may easily differentiate separate signals so that it is clear how to correct the steering. Rather than overreact when receiving a first signal, the driver may initially make minor adjustments to not disrupt the general direction causing overcorrection to change the direction too dramatically.

In the case of an autonomous tow vehicle, the vehicle automatically drives trailer onto a boat launch. This enables all of the occupants to get into the boat. The tow vehicle may then drive itself into a parking lot. When the users return from their boating trip, they can summon the vehicle and trailer.

The ABL automatically senses the length of the trailer, from the pivot point to the axle. The angle of the trailer with respect to the tow vehicle is measured via: cameras on vehicle or on trailer, rear view camera perception of the trailer vs. the road moving below while moving, ultra-sonic sensors sensing distance to trailer, and therefore angle of trailer to tow vehicle. Radar, lidar, and other sensors to detect angle. Magnetometer, gyro's, and other sensors physically attached. The trailer may include additional sensors such as attitude, pressure or other sensors that detect water depth.

By monitoring the trailers angular movement with respect to the tow vehicle, the distance from the pivot to the axle may be learned. This may occur by observing the front of the trailer, the truck with respect to the trailer, and the side of the trailer.

Tractrix involute curves are utilized to describe the motion of the tow vehicle and trailer. Regression is used to solve for the distance from the pivot to the axle. Once this is known, the off tracking may be calculated for various curves. Inputs into the function would include: Steering wheel angle sensor, wheel speed sensors, tow vehicle to angle sensing (camera, Infrared, Lidar, Radar, Ultra-sonic, Gyro, Magnetometer, etc.)

System can be a hub for the broader internet of towing. This system may communicate with fleet management systems, other vehicles, and other products on board the vehicle.

The ABL consists of software and/or firmware and other equipment or systems that enable the hardware and systems in a vehicle to make adjustments to control systems within the vehicle.

The ABL may include one or more of the following components:
1. Software
2. Firmware
3. Hardware
4. Camera
5. Sensors—electrical, electro-mechanical, automotive, chemical, navigational, thermal
6. Magnetometer, gyro's, motion sensor, radar, lidar, proximity sensor
7. Accelerometers
8. Processor
9. Controller or microcontroller
10. Memory or other data storage device or module
11. Wireless network device
12. Mobile device The basic process of how the ABL is used or implemented is as follows:

A user opens the ABL app on a mobile device (or app "on-board" vehicle for OEM implementation) that prompts the user to indicate equipment included in the system. If the equipment included is a trailer, for example, the user is prompted to indicate that the trailer is part of the system and to include the trailer and its hitch location. The user may manually enter data regarding this trailer data, or it may be determined automatically (for example—wirelessly via WIFI or other wireless communication devices).

In some embodiments, the trailer and its hitch location are recognized by the ABL automatically so that no user interface is required. Cameras, proximity sensors, or other sensors on the trailer and tow vehicle may inform the ABL regarding hitch configuration and location. The ABL may determine trailer and hitch compatibility prior to a trailer hookup event. Once the trailer and hitch are known by the ABL, the driver or autonomous control system is prompted to begin backing up the tow vehicle.

Information regarding hitch location is communicated in real-time, enabling real-time adjustments to be made while the vehicle is backing up. These adjustments may be made initially when the driver first starts driving the vehicle based on pre-set data, or measured data made prior to a first trailer hookup event. As the vehicle begins a first trailer hookup event, the ABL may monitor the trailer length and hitch location and make further adjustments to the trailer data based on the behavior of the system while hooking up the trailer.

In certain embodiments, a custom hookup profile may be developed by building a profile for each trailer hookup characteristic. For example, there may be a hookup profile called "trailer A" which comprises a hookup profile for a trailer with stabilizer hitch. In this case, the tow vehicle recognizes that "trailer A" requires additional hookup requirements (connecting the stabilizer arms) in addition to the hitch connection to the pivot point. In another example, a hookup profile "trailer B" may be for a fifth wheel trailer. In this example, the control system of the autonomous vehicle, or the driver may be alerted that the trailer can not be connected to the tow vehicle. For example, a bumper hitch set-up will not work for a fifth wheel trailer. This info is communicated to the driver or autonomous control system prior to the hookup event.

Since each case may require different settings for the control system, or other related systems based on the trailer type and hitch configuration, a unique profile may be stored in memory and used in the future for that same application. In this way, the "trailer A" profile may then be engaged every time the trailer is hooked up.

In addition to trailer and vehicle determination, the properties of the physical environment in the immediate area surrounding the tow vehicle and boat trailer are detected by cameras and sensors to establish safe operating parameters. The driveway or boat ramp the trailer is to be backed up into is identified prior to backing up. This may be done by identifying the desired driveway by a user or driver. There may be an image displayed on the app identifying the approach or driveway. This may be selected by the user by touching a touchscreen in the location of the driveway. In some embodiments, the app may recognize both sides of the driveway, along with the stopping point that the trailer is to be backed up to. The app may highlight these parameters (right side, left side, and stopping point). The user may either accept the highlighted parameters, or slide along the touch screen in the appropriate direction to move or adjust these parameters if required.

If the stopping point is a boat ramp, the app may require more info such as the depth of the water or the angle of the ramp in order to determine the best stopping point. This may vary according to the specific trailer and boat type for example. Since the set-up was previously done for the specific trailer and boat, these parameters are known. The ABL may use sensors and cameras to determine the characteristics of the driveway or ramp that enters the water and decide the best stopping point that allows the boat to be launched properly. Once this determination has been made, the user or driver may be able to modify these parameters based on personal judgement. The ABL may store these parameters for future use including a trailer profile, a tow vehicle and trailer profile, and a profile including one or more of the tow vehicle, the trailer and the boat ramp. In this way, these parameters may be learned, calibrated and improved each time a trailer is backed up and each time a boat is launched.

In addition to the stopping point of the trailer, the parking location of the tow vehicle is also identified by the user or driver during the determination phase. Prior to backing up, the user or driver may identify the parking location of the autonomous vehicle. In some embodiments, the parking location is known for the autonomous vehicle based on the vehicle type and proximity to the boat ramp or driveway location.

Other potential obstructions in the environment surrounding the drive approach are also detected by the ABL and may be entered in the app by the user or driver. For example, there may be a light pole on one side of the drive approach that is close to the desired drive path. Cameras and sensors establish this light pole as a potential obstruction so that the driver or control system may "steer clear" of the obstruction. The drive path of both the trailer and the tow vehicle are analyzed for these obstructions, and similar zone alerts are issued based on how close the vehicle or trailer come to these obstructions. Similar alerts may be issued (may be unique and different alerts from the angle alerts) enabling the driver or control system to make adjustments as required.

Obstructions are identified during the initial drive path identification phase (prior to backing up). In addition, the ABL may also continuously monitor for obstructions during the back up phase. For example, a child may be playing in the vicinity, but not near the drive path during the path id phase. However, once the vehicle starts to move backwards, the child may move into one of the obstruction zones. In this case, the ABL may immediately warn the driver and the control system to stop the vehicle.

The ABL determines allowable hitch angles, and does not allow the trailer to exceed critical angles creating a jackknife condition. The ABL communicates operating parameters and critical angles to the driver of the vehicle and to the control system of an autonomous vehicle. This data along with vehicle and trailer configuration data is communicated to the processors or on-board computers that control the operation of the vehicle and systems related to hooking up a trailer. Information regarding trailer length, hitch location and weight is communicated in real-time, enabling real-time adjustments to be made to the vehicle as it is backing up the trailer.

Feedback from adjustments made to various on-board control systems may be further detected by the ABL in order to further refine and calibrate the settings and profiles. These profiles are stored in the memory of the ABL and used to determine the appropriate settings for subsequent trailer hookup events. Every time the vehicle and trailer are hitched up, on-board sensors and cameras record the behavior of the operation of hooking up the trailer in order to inform that specific vehicle and trailer hookup profile.

The ABL automatically senses the hitch of the trailer while the tow vehicle is backing up. The location of the trailer hitch with respect to the tow vehicle pivot point is measured via: Rear view camera perception of the trailer vs. the road moving below. Ultra-sonic sensors sensing distance to trailer and trailer hitch, and therefore angle of trailer to tow vehicle. Radar, lidar, and other sensors to detect angle. Magnetometer, gyro's, and other sensors that detect motion and weight of the vehicle and trailer may also be employed.

By monitoring the trailer's angular movement with respect to the tow vehicle, the distance from the pivot to the hitch may be learned. This may occur by the camera capturing images of the trailer hitch in real time as the vehicle is backing up. Distance and hitch location may then be determined.

As the vehicle is backing up, the ABL may suggest that the driver (via audible and/or visual alerts), adjust the speed or steering to assure the correct angle conforming to a required path of travel. The ABL may also report this info to the control system of an autonomous vehicle. In some embodiments, this may be done in real time and proactively—anticipating the required adjustments and recording the effect of these adjustments. Sensors may record the result of each adjustment and add this data to the profile for that specific set-up under those specific conditions. As the sensor data is reported, the ABL may also make immediate adjustments that may influence the hitch angle and drive path in real-time.

Once the stopping point has been reached, the ABL may notify the driver or autonomous control system that the trailer is now in the correct position. In some embodiments, the ABL may determine a change in the weight of the trailer once the boat has started to float and the mass of the trailer is therefore reduced. This may be used to determine the actual stopping point. Once the stopping point has been established, a profile may be determined for that specific set-up. Each time the trailer is backed up and boat launched the profile may be refined and further calibrated. Use input may also be accepted via a user interface such as a mobile device to further refine the calibration settings.

In the case of an autonomous vehicle, the boat may be released from the trailer once the trailer stopping point has been reached. This release may be done either automatically by the ABL as programmed or previously determined by the user, or it may require a "boat release" command from the control system. The app may prompt the user to push a button to release the boat from the trailer. The communication from the ABL to the boat release mechanism may be wireless. The ABL may send an "unwind" command to a winch that lowers the boat into the water along with a "detach" command that releases the boat from the winch cable, and a "retract" command to rewind the cable and lock it into place on the trailer. These are examples of commands that may be given to one or more boat trailer systems or products that may be compatible with the ABL. The ABL may further comprise one or more various control and wireless types and configurations as required, enabling it to communicate with these products and systems as required to allow operation of these products or systems by the ABL.

Once the boat has been launched, another command may be communicated to the ABL by the user or driver to park the tow vehicle. The parking location was previously identified by the user during the determination phase, and the autonomous vehicle parks itself in the identified parking spot.

After the boating activity is completed, the user may "summon" the tow vehicle by pushing a "return" button (or the like) on the app. Once the summon command is received by the ABL, the autonomous tow vehicle follows the same process of backing up the trailer onto the boat ramp to receive the boat.

In a similar way, a "retract" command on the app may extend the winch cable to the boat and connect it to a bracket on the boat enabling the boat to be pulled back on to the trailer. In the case of manually connecting the cable, the app may instruct the user or driver to make the connection then push a "boat secured" button (or the like) on the app alerting the app that the boat has been secured to the trailer. Once the boat is secured, the autonomous vehicle may drive to a previously identified location to pick up the driver or user.

The ABL may also further comprise a hub for the broader internet of towing. The ABL may communicate with fleet management systems, other vehicles, and other products on board the vehicle and on the trailer.

In certain embodiments, the ABL may be implemented directly into the vehicle in a factory or OEM application. In other embodiments, the ABL may be retrofitted to an existing vehicle. In a retrofit application, the ABL may plug into the vehicle's OBD port to allow interface with the vehicle's control system. Alternatively, it may be connected wirelessly either via a wireless adapter to the OBD, or to other wireless interface devices that connect the ABL to the vehicle's control systems.

The ABL may also interface with autonomous or semi-autonomous vehicles, informing the control system regarding weight and the impact that weight has on the engine and other systems.

In certain embodiments, the ABL may be implemented via a local network. The local network may comprise the engine, and all associated control systems that affect the operation of the engine and the vehicle. The ABL may communicate weight and engine loading data to each of these systems. In certain embodiments, the ABL may develop performance profiles based on adjustments made based on weight and engine loading. The ABL may further monitor the performance of these systems based on the performance profile in order to calibrate and refine the settings.

In other embodiments, the ABL may further comprise connection to a cloud network. For example, user profiles, drive mode profiles, vehicle profiles, and system settings may be stored and accessed via a connection to the cloud. This connection may be via wireless devices or transmitter and receivers. In some embodiments, both monitoring and control of the ABL may also be done via the cloud.

A mobile device may also be used for a user interface with the ABL. In some cases, the processor in a mobile device along with other ABL components may be comprised within the mobile device, and the mobile device may interface with the vehicle via a wireless connection. The mobile device may allow for user data or changes to the factory presets to be entered in.

In another embodiment, the user interface with the ABL may be via the vehicle's infotainment system or other interface device on the dashboard of the vehicle.

FIGURES

FIG. 1A is an illustration depicting one scenario demonstrating how the trailer path and tow vehicle path optimization system 120 may be implemented for a specific truck pulling a flatbed trailer. Truck 101 is shown hauling flatbed trailer 102. Image sensor 118 on the back of truck 101, and image sensor 116 on the rear-view mirror are aimed towards the trailer 102 in order to collect data regarding the trailer path. The length 106 of Flatbed trailer 102 is different than the length 108 of camp trailer 110 shown in FIG. 1B, so the system 120 determines the specific behavior of the flatbed trailer 102 based on its length 106.

FIG. 1B is an illustration depicting one scenario demonstrating how the trailer path and tow vehicle path optimization system 120 may be implemented for a specific truck pulling a camp trailer. Truck 101 is shown hauling camp trailer 110. Image sensor 118 on the back of truck 101, and image sensor 116 on the rear-view mirror are aimed towards the trailer 102 in order to collect data regarding the trailer path. The length 108 of camp trailer 110 determines the specific behavior of the camp trailer 110.

FIG. 1C is an illustration depicting a car dashboard, steering wheel and shifter. Trailer path and tow vehicle path optimization system 120 is shown behind the dashboard near the steering wheel. In some embodiments, the system 120 is an OEM product incorporated into the vehicle at the time of manufacture. In other embodiments, the system 120 may be connected to the vehicle via the OBD port 122 as an after-market component. In one embodiment, the OBD connector may have a wireless connection to the system. In another embodiment, the system may be plugged into the OBD port 122 with a wired connector.

In another embodiment, an after-market wireless device 130 may be attached to the vehicle. The vehicle may have a tow/haul button 124 on the dash of the vehicle. Other user interface devices may include an infotainment system 134, vehicle control system user interface buttons 132, or user interface panel 126. The purpose of these interface devices is to provide one or more methods for the user or driver to input settings, or to communicate to the monitoring system. The interface devices also provide a way for the system to communicate a vehicle path condition and to alert the driver to changes in the vehicle path or additional conditions detected by the system that require user intervention.

For example, the driver or user may enter the details of a trip prior to engaging the system. Details may include the specifications for the trailer (length and width for example), along with other details relating to the travel path of the trailer. The system may then determine that the trailer is compatible with the tow vehicle. At this point, the driver may then connect the tow vehicle to a trailer. The system may also communicate the required trailer ratings or type needed for the identified trip. In some embodiments, the system may automatically recognize the trailer prior to connection to the tow vehicle and alert the driver prior to hooking it up. In this way, the system may proactively assist the driver in the initial towing set-up.

FIG. 2A is an illustration depicting one scenario demonstrating how the monitoring system 120 may be implemented for a specific truck pulling a flatbed trailer 120. System 120 may communicate via wireless signal 204. Truck 101 is shown hauling flatbed trailer 102. Trailer path may be communicated by wireless device 220, and load 240 may be communicated to the system 120 via trailer wireless signal 224. Trailer hitch type and connection may be determined by sensor 210 and communicated via wireless signal 212. Friction, slippage or drift of the rear of the trailer 102 may be determined by sensor 230 and communicated via signal 234.

FIG. 2B shows a cloud 250 network communicating via wireless signal 252. The cloud may communicate to the system to store vehicle and trailer path data as a back-up for any memory loss to the vehicle mounted system components. System components may be redundantly included in the cloud, on the vehicle system component and on a mobile device. In this way, various system components that may be damaged or otherwise rendered inactive for any reason may be backed up by these redundant system components. For example, if a vehicle's computer or control system is damaged, a complete copy of all settings may be re-installed into a new replacement computer or control system. All relevant data and information including modeling for each set-up are communicated to the cloud 250. All settings, manufacturers ratings, set-ups and user input data may be stored in the cloud. In some embodiments, set-up information may be retained in the cloud 250 and downloaded to the system after a system failure, or data loss.

FIG. 2C illustrates a mobile app on the mobile device 260 shown. In this embodiment, the system is on the mobile device and all interface between the tow vehicle and trailer is done wirelessly via signal 262.

FIG. 2D is an illustration of a wireless hub 270, which may function as a bridge or connecting device to a network. Wireless signal 272 may connect the hub 270 to the monitoring system.

Figure 3A:
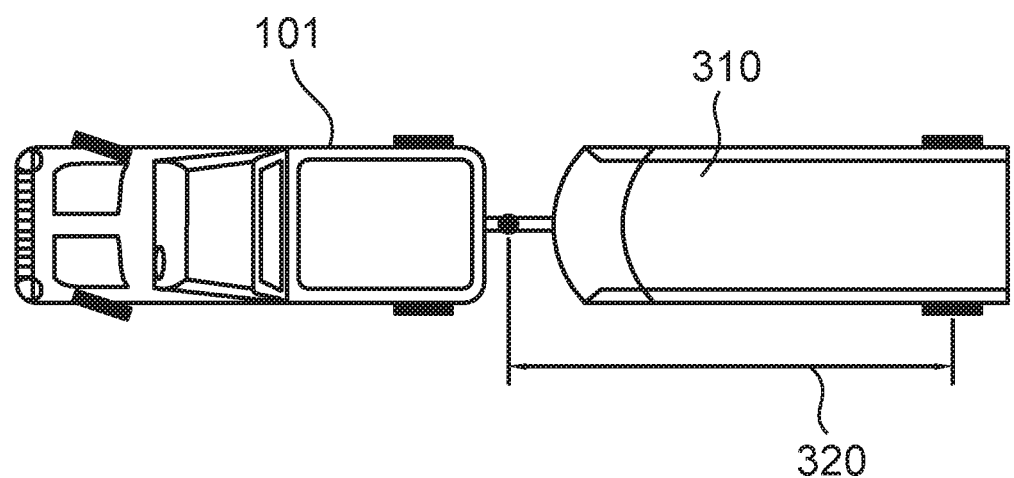
FIG. 3A is an overhead view of a truck and trailer.

FIG. 3A is an overhead view of a truck and trailer. Truck 101 is shown pulling trailer 310. Trailer length 320 is determined by the trailer path and tow vehicle path optimization system.

Figure 3B:
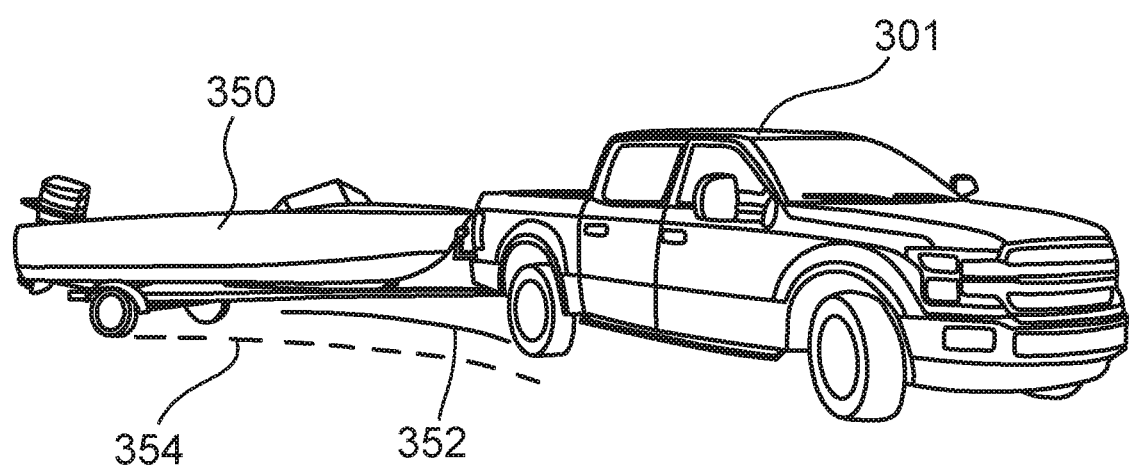
FIG. 3B is a perspective view of a truck pulling a boat trailer.

FIG. 3B is a perspective view of a truck pulling a boat trailer. Truck 301 follows along path 352 while turning a corner. Off-tracking 354 of the boat trailer 350 is shown. Since the off-tracking 354 may allow the trailer to come to close to an obstruction at the corner of the turn, the trailer path and tow vehicle path optimization system may alert the driver to make a wider turn as approaching the corner. Likewise, the system may alert the vehicle control system to make adjustments to the tow vehicle (take a wide approach to the turn) in order to prevent the boat trailer 350 from running into an obstruction at the corner.

Figure 4A:
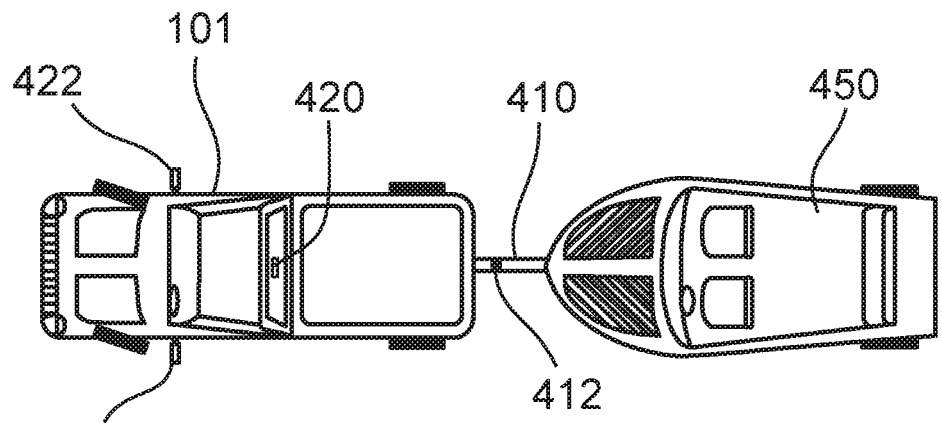
FIG. 4A is an overhead view of a truck towing a boat trailer.

FIG. 4A is an overhead view of a truck towing a boat trailer. Truck 101 is aligned with boat trailer 450 and connected at hitch pivot point 412. Image sensor 420, right image sensor 422 and left image sensor 424 collect data regarding the position of the boat trailer 450.

Figure 4B:
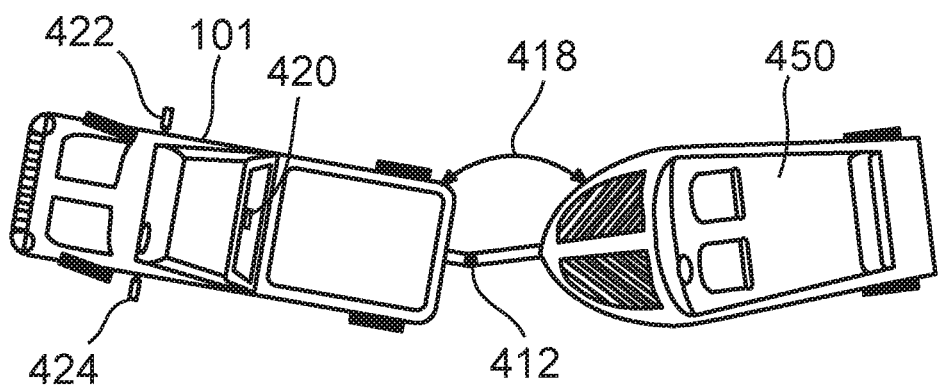
FIG. 4B is an overhead view of a truck beginning to turn while towing a boat trailer.

FIG. 4B is an overhead view of a truck beginning to turn while towing a boat trailer. Truck 101 is backing up with boat trailer 450 and is starting to turn at pivot point 412. The angle 418 between the truck 101 and boat trailer 450 decreases as the truck 101 is backing up. Image sensor 420, right image sensor 422 and left image sensor 424 collect data regarding the position of the boat trailer 450 along with the trailer path.

Figure 4C:
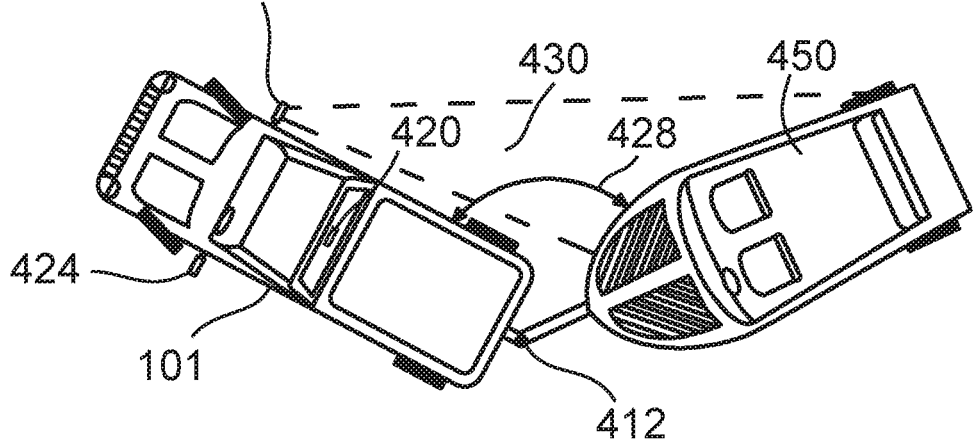
FIG. 4C is an overhead view of a truck in a tight turn while backing up a boat trailer.

FIG. 4C is an overhead view of a truck in a tight turn while backing up a boat trailer. Truck 101 is backing up boat trailer 450 and is turning at pivot point 412. The angle 428 between the truck 101 and boat trailer 450 is very tight and approaching a jack-knife position as the truck 101 is backing up. Image sensor 420, right image sensor 422 and left image sensor 424 collect data regarding the position of the boat trailer 450 along with the trailer path. Right image sensor 422 may have a wide view 430 of the trailer at this angle. The system may alert the driver or the autonomous control system that the truck 101 has approached the turning radius limit and must be adjusted to avoid jack-knifing.

Figure 5:
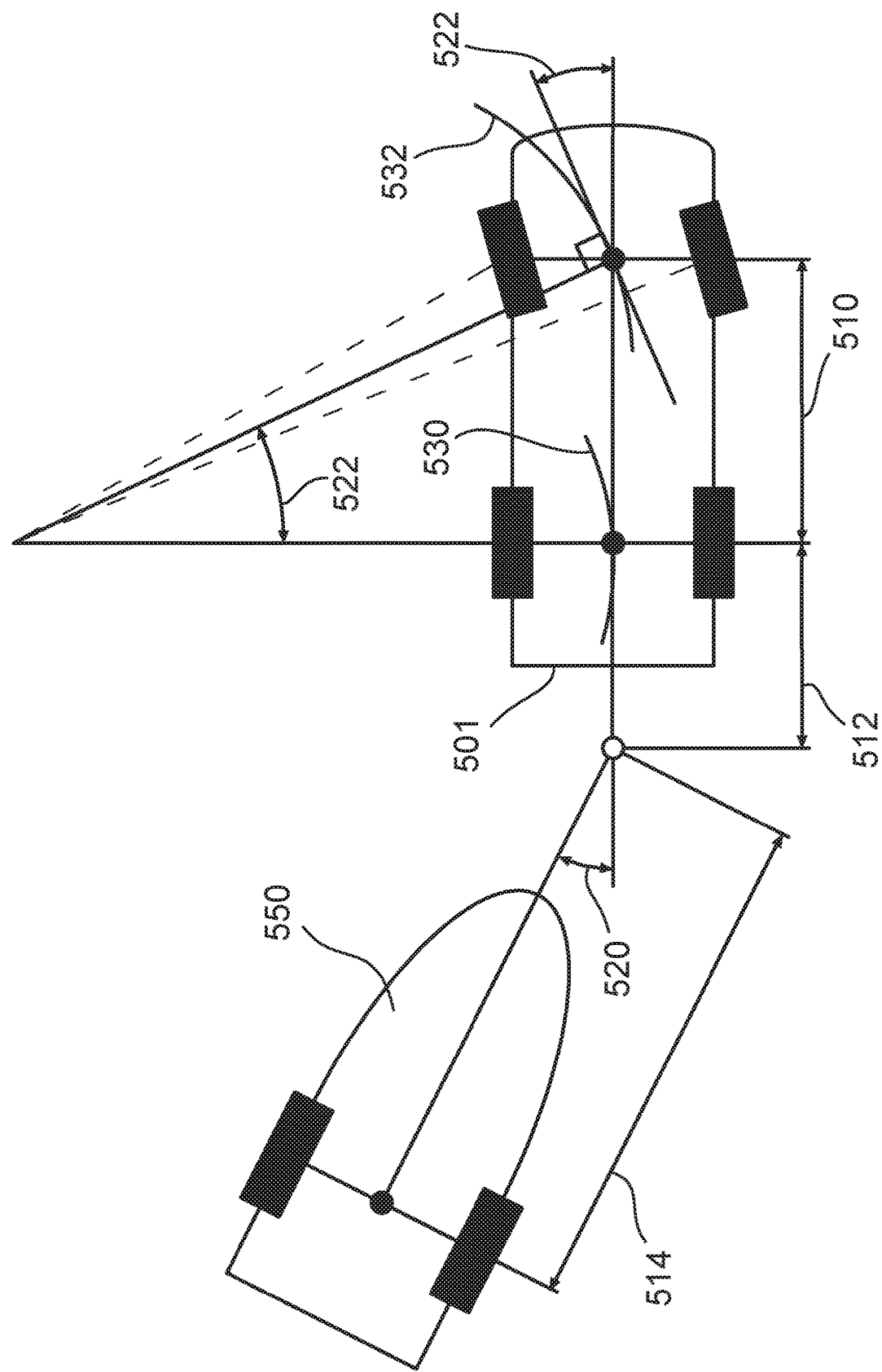
FIG. 5 is an illustration of a truck connected to a trailer showing geometry angles.

FIG. 5 is an illustration of a truck connected to a trailer with angles and geometry indicated. Truck 501 is connected to trailer 550.

Model geometry showing variables a, b, c, ϕ, θ, s, and r. The following variables are used:

510=a: The length from the midpoint of the front (turning) axle to the midpoint of the rear axle.

512=b: The length from the midpoint of the rear axle to the trailer hitch pivot.

522 c: The length from the trailer hitch pivot to the midpoint of the trailer axle.

522=ϕ: The instantaneous angle, in radians, between the centerline of the towing vehicle and the direction of travel of the midpoint of its front axle.

520=θ: The instantaneous angle at the trailer hitch, in radians.

532=s: Integrated arc length measured from the midpoint of the front axle.

530=r: Integrated arc length measured from the midpoint of the rear axle. This is related to s by the conversion:

$$\frac{dr}{ds} = \cos\phi.$$

The angle ϕ can also be measured from the center point of the turning radius circle as the angle between the line that passes through the center point and the rear axle and the line that passes through the center point and the midpoint of the front axle.

The angle θ is defined in such a way that it is 0 when the trailer is straight.

The convention pictured is that both angles are positive during a left turn, but the equations are the same so long as the same sign is used for both angles.

The quantity of interest is the rate of change of the angle θ, either with respect to the total motion of the front axle midpoint, namely dθ/ds, or with respect to the forward motion of the rear axle midpoint, namely dθ/dr.

The equations:
Given these variables, the rate of change of the angle at the trailer hitch is given by the formula:

$$\frac{d\theta}{ds} = \frac{1}{c}\cos\phi\sin\theta + \frac{b}{ac}\sin\phi\cos\theta + \frac{1}{a}\sin\phi$$

or by the formula:

$$\frac{d\theta}{dr} = \frac{1}{c}\sin\theta + \frac{b}{ac}\tan\phi\cos\theta + \frac{1}{a}\tan\phi.$$

Either derivative has units of inverse length (radians per distance traveled), where the length unit matches the unit in which a, b, and c are expressed.

Under conditions that make the correct denominators non-zero (for example, during a turn), it is possible to solve for the trailer length c if one has a measurement of either angle derivative:

$$c = \frac{a\cos\phi\sin\theta + b\sin\phi\cos\theta}{ad\theta/ds - \sin\phi}$$
$$= \frac{a\sin\theta + b\tan\phi\cos\theta}{ad\theta/dr - \tan\phi}.$$

Figure 6:
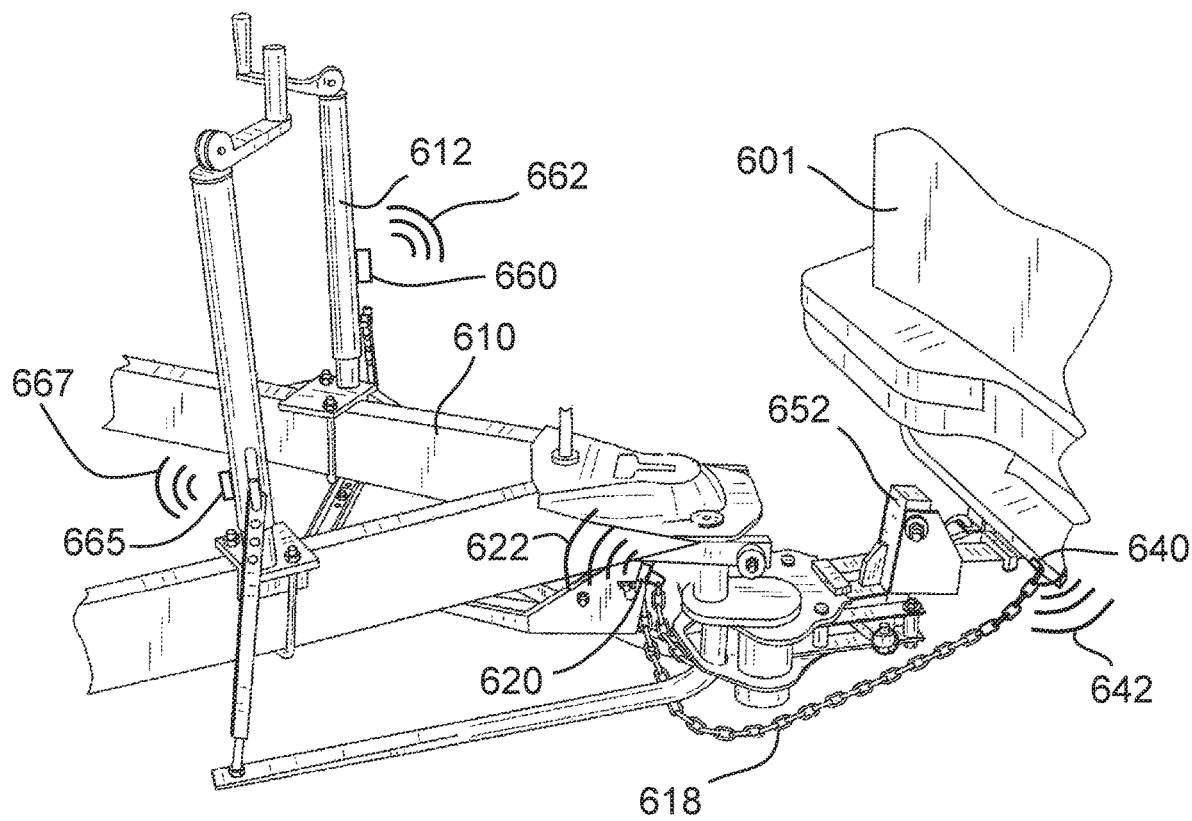
FIG. 6 is an illustration of a trailer hitch connected to the back of a truck.

FIG. 6 is an illustration of a trailer hitch connected to the back of a truck 601. Truck 601 has a receiver hitch 652 which is connected to trailer 610. In this embodiment, the receiver hitch 652 has a wireless device 640 for communication of data to the system. The trailer 610 also has a wireless transmission device 620. The system may automatically request notification from wireless device 440 via wireless signal 642, and wireless device 620 via wireless signal 622 as the trailer 610 is hooked up. In some embodiments, device 640 may also include a sensor indicating that the chains 618 have been connected. The data informing the system may also include this chain connection data to assure that the safety chains 618 are in place before driving off. In a similar manner, jacks 612 may include sensors 660 and 665 that transmit signals 662 and 667 to the system alerting the system that the jacks are fully seated and in the correct position. In certain embodiments, jacks 612 and 613 may adjust anti-sway or stabilizer bars. The proper settings for this equipment may be communicated to the system. Any deviations from the correct set-up may be communicated to the user and to a monitoring station. The user may then have the option to make adjustments to the set-up to bring it into compliance with the recommended settings and equipment ratings before operating the vehicle.

Figure 7A:
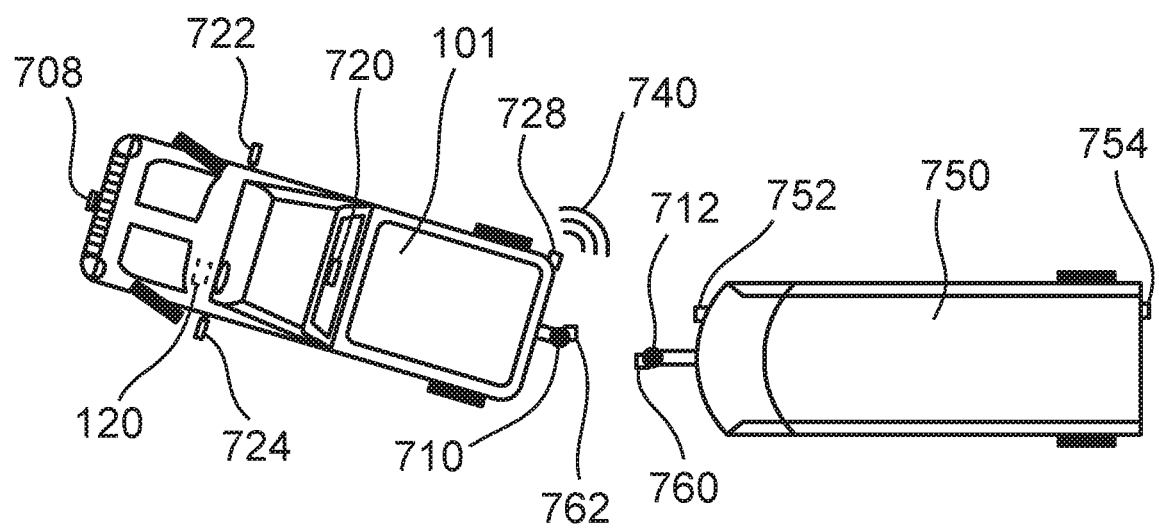
FIG. 7A is an overhead view of a truck backing up to a trailer.

FIG. 7A is an overhead view of a truck backing up to a trailer. Truck 101 is shown backing up to trailer 750. Image sensor 720 on the back of truck 101, and image sensors 722 and 724 on the rear-view mirrors are aimed towards the trailer 750 in order to collect data regarding the trailer path. Image sensor 754 captures image data behind the trailer 750. Image sensor 708 captures image data in front of the truck 101. The system 120 is shown in the truck 101. The truck's receiver hitch 710 is shown nearing the trailer hitch 712. Tow vehicle alignment sensor 752 is attached to trailer 750. Trailer alignment sensor 728 is attached to the truck 101 and communicates to the tow vehicle alignment sensor 752 via wireless signal 740. As the truck 101 approaches the trailer 750, the alignment sensors 728 and 752 and position sensors 760 and 762 continuously communicate position and alignment data to the system 120 which determines tow vehicle path and adjusts the steering and motion of the vehicle to direct the receiver hitch 710 to the trailer hitch 712.

Figure 7B:
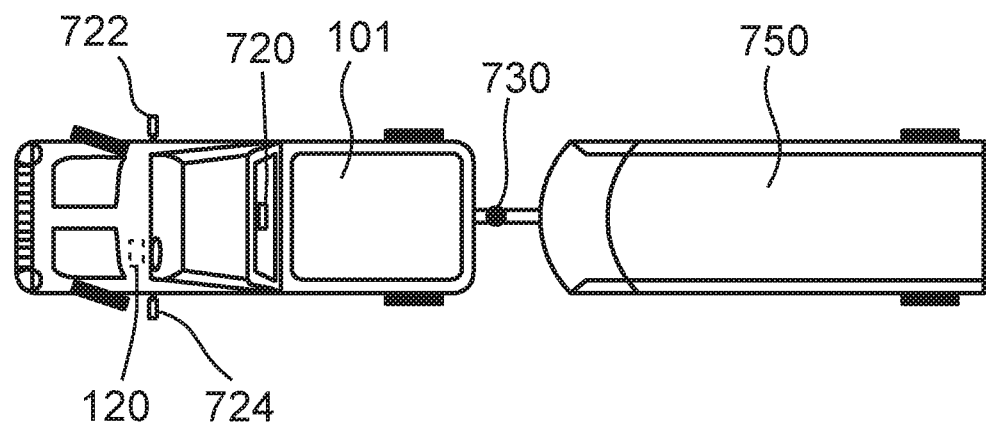
FIG. 7B is an overhead view of a truck and a trailer.

FIG. 7B is an overhead view of a truck and a trailer. In this embodiment, Truck 101 has backed up and connected to trailer 750. The connection 730 of the receiver and trailer hitch pivot point is shown. Once connected, the position of truck 101 and trailer 750 may be monitored via image captured by image sensor 720 on the back of truck 101 and image sensors 722 and 724 on the rear-view mirrors.

Figure 8A:
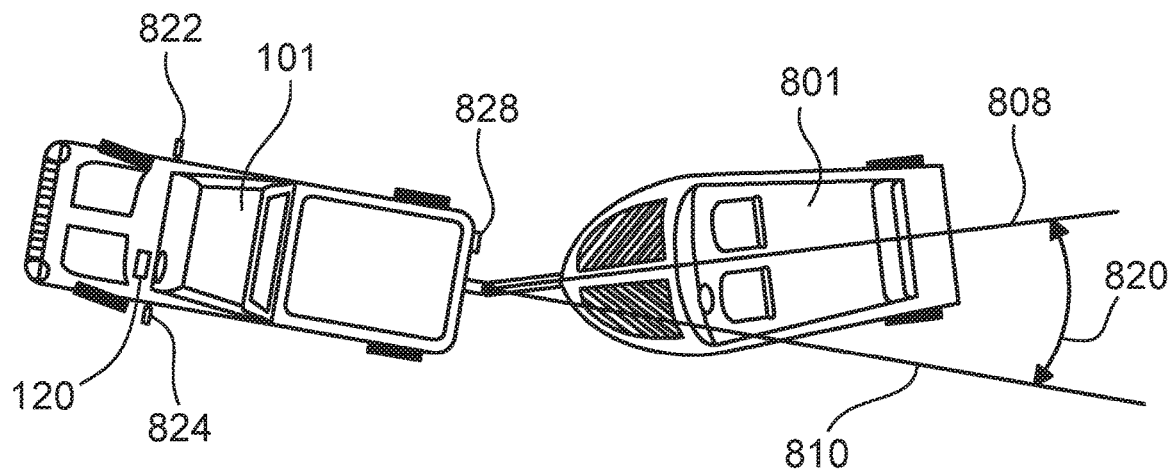
FIG. 8A is an overhead view of a truck and trailer showing the hitch angle of the trailer.

FIG. 8A is an overhead view of a truck and trailer showing the hitch angle of the trailer. Truck 101 is shown connected to boat trailer 801. Image sensor 828 on the back of truck 101, and image sensors 822 and 824 on the rear-view mirrors are aimed towards the boat trailer 801 in order to collect data regarding the trailer path which is reported to the system 120. The hitch angle 820 is shown which describes how far out of alignment the boat trailer 801 is from the truck center line 810 which is aligned with the truck 101 and boat trailer center 808.

Figure 8B:
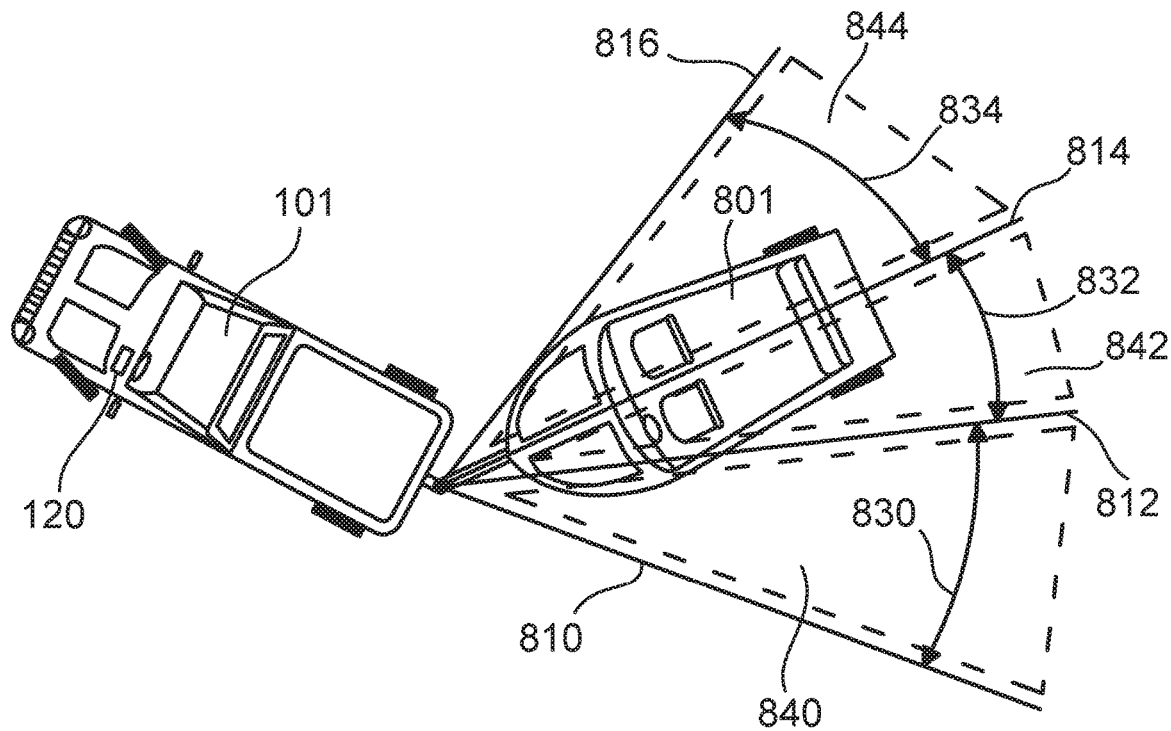
FIG. 8B is an overhead view of a truck and trailer showing several hitch angles and trailer position zones.

FIG. 8B is an overhead view of a truck and trailer showing several hitch angles and trailer position zones. Truck 101 with system 120 is shown connected to boat trailer 801. Three zones are shown indicating ranges of trailer angle positions with respect to the truck 101. Safe zone 840 is between truck center line 810 and trailer angle 812. Caution zone 842 is between trailer angle 812 and trailer angle 814. While in caution zone 842, the system 120 sends an alert to the user and the vehicle control system that the angle may be approaching the critical zone 844. Critical zone 844 between trailer angle 814 and trailer angle 816 indicates a zone where jack knifing and damage to the truck 101 and boat trailer 801 may occur. Angle 830 defines the angle between the parameter lines defining safe zone 840. Angle 832 defines the angle between the parameter lines defining caution zone 842. Angle 834 defines the angle between the parameter lines defining critical zone 844.

Figure 9A:
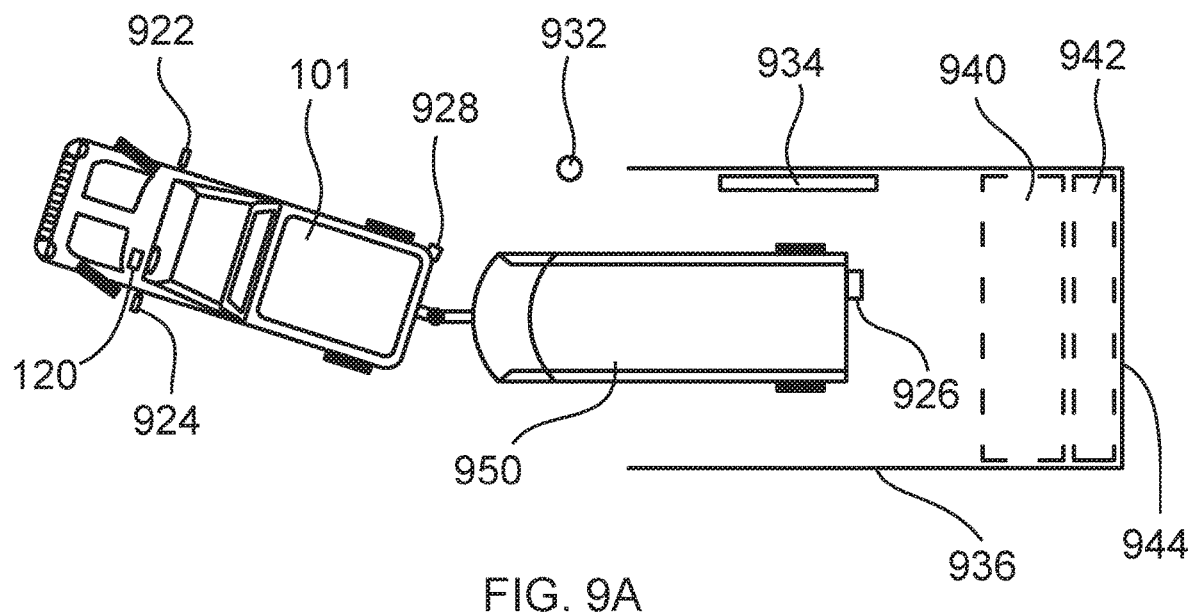
FIG. 9A is an overhead view of a truck and trailer backing up towards a loading area.

FIG. 9A is an overhead view of a truck and trailer backing up towards a loading area. Truck 101 is connected to trailer 950 and is backing up towards loading area end curb 944. Image sensors 922, 944, 928 and 926 report image data to system 120 which sends control commands to the vehicle control system regarding adjustments that may be made to the path of the trailer 950. Obstructions including bollard 932 and guard rail 934 are avoided by the instructions provided by the system 120. Other boundaries like side curb 936 may also be identified by the image sensors and avoided. Caution zone 940 indicates the area approaching the maximum stopping zone for the back of trailer 950. Stop zone 942 indicates where the back of trailer 950 must stop.

Figure 9B:
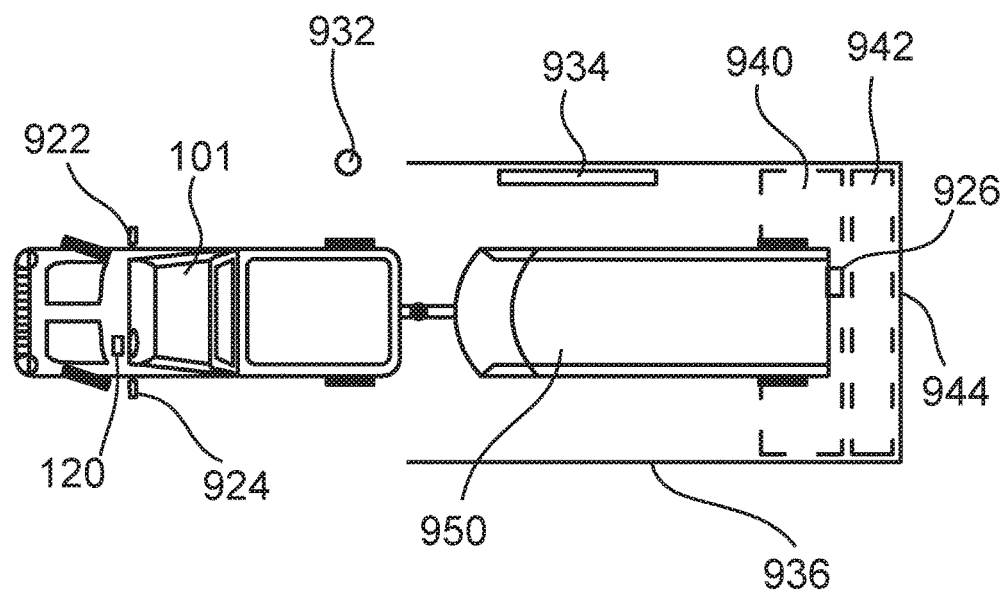
FIG. 9B is an overhead view of a truck and trailer parked in a loading area.

FIG. 9B is an overhead view of a truck and trailer parked in a loading area. Truck 101 with system 120 is connected to trailer 950 and is stopped and parked in loading area near end curb 944. Image sensors 922, 924, 928 and 926 are shown, along with bollard 932, guard rail 934, and side curb 936. Trailer 950 is parked in a position with the back of the trailer within the caution zone 940 near the stop zone 942.

Figure 10A:
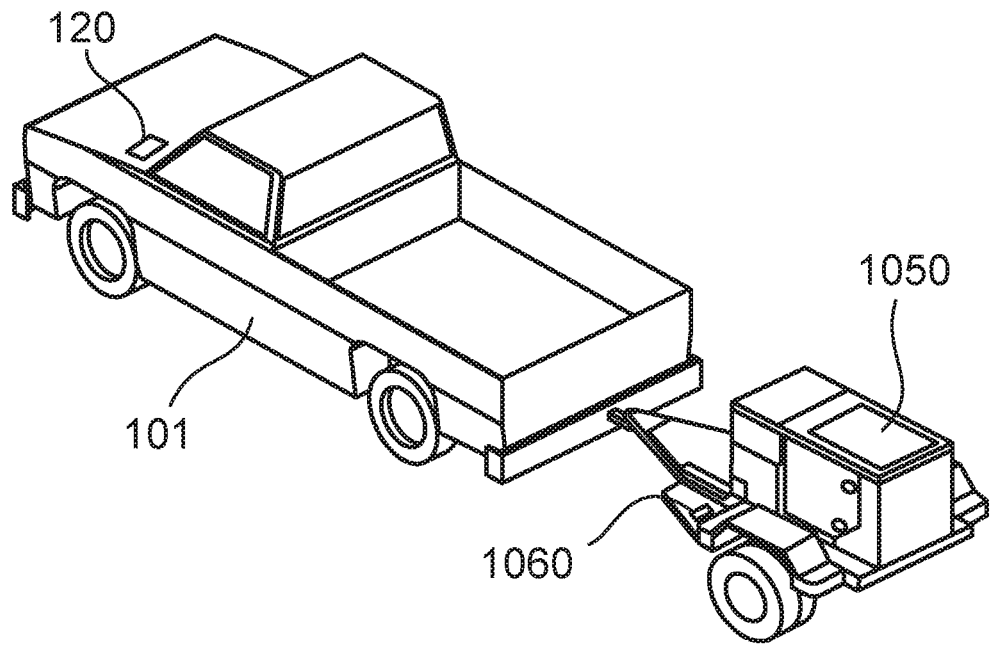
FIG. 10A is a perspective view of a truck pulling an equipment trailer.

FIG. 10A is a perspective view of a truck pulling an equipment trailer. Truck 120 with system 120 is shown pulling equipment trailer 1050. Sensor 1060 may communicate sensor data to system 120. In some cases the equipment trailer 1050 may be brought to the site and detached from the tow vehicle.

Figure 10B:
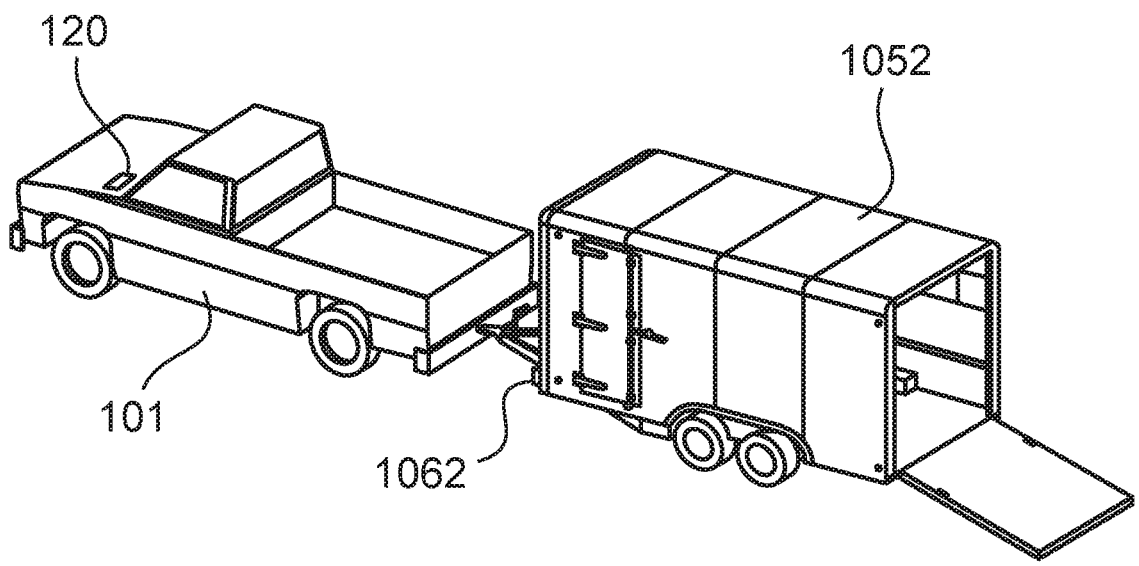
FIG. 10B is a perspective view of a truck pulling a moving trailer.

FIG. 10B is a perspective view of a truck pulling a moving trailer. Truck 101 with system 120 is shown pulling moving trailer 1052. The moving trailer 1052 may be left on site while it is loaded, then an autonomous tow vehicle may be summoned to come pick up the loaded trailer at a later date or time once it is ready to move.

Figure 11A:
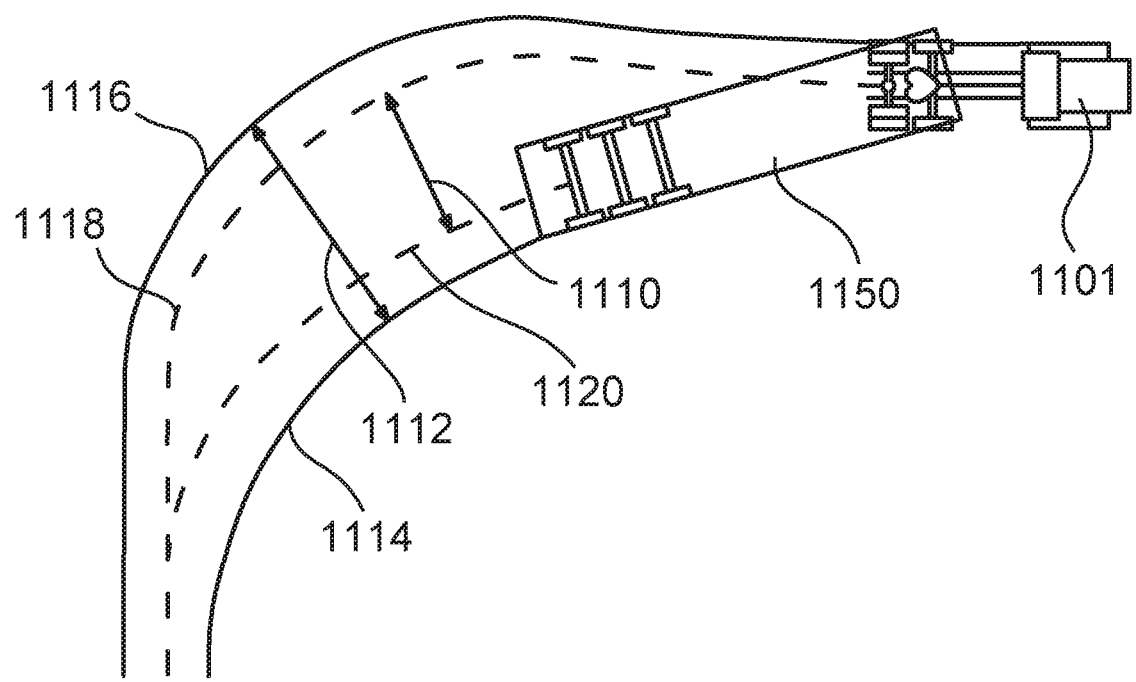
FIG. 11A is an illustration of an example of off-tracking.

FIG. 11A is an illustration of an example of off-tracking. Tractor 1101 is shown towing trailer 1150. Tractor path 1118 is shown along with trailer path 1120. The trailer 1150 is off-tracking from the tractor path 1118. Off-tracking 1110 path is shown along with maximum width of swept path 1112. Outermost path 1116, path of the steer angle midpoint 1118, innermost path 1120 and path of the rearmost trailer axle midpoint 1114 are shown. The back of the trailer cuts the corner and may hit obstructions if the corner of the roadway is not wide enough to accommodate the off-tracking. The AMTT determines the extent of off-tracking and guides the autonomous vehicle in such a way to avoid hitting obstructions when off-tracking occurs.

Figure 11B:
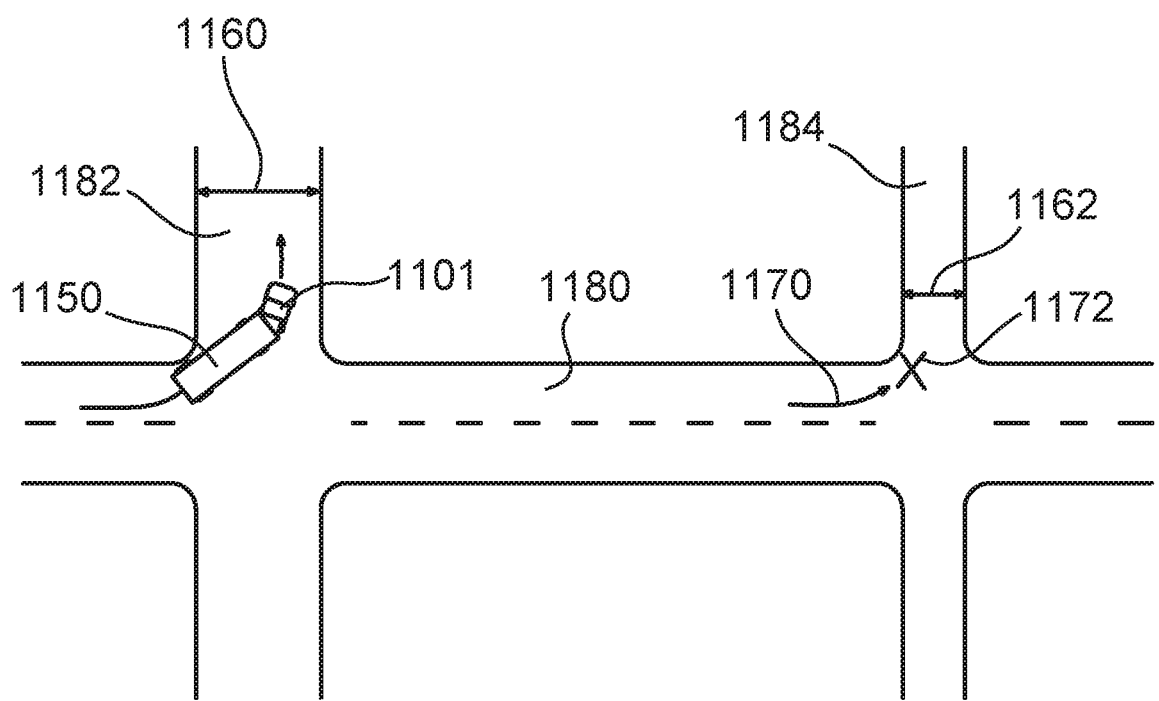
FIG. 11B shows a tractor-trailer turning down a side street.

FIG. 11B shows a tractor-trailer turning down a side street. Tractor 1101 is shown pulling a trailer 1150 and turning at a first street 1182 that has a width 1160 wide enough to accommodate an off-tracking turn path. The first street 1182 may be an alternate route when a second street 1184 may have a narrow width 1184 that is not wide enough to allow for the off-tracking. Map and route data may be communicated to the system via the cloud indicating the alternate route. Attempted turn 1170 may be avoided based on information that the narrow street 1184 is not passable 1172. The system may inform the control system of an autonomous vehicle regarding the alternate route so that the vehicle may make this change in routing prior to reaching the narrow "normal" route at the second street 1184.

Figure 12:
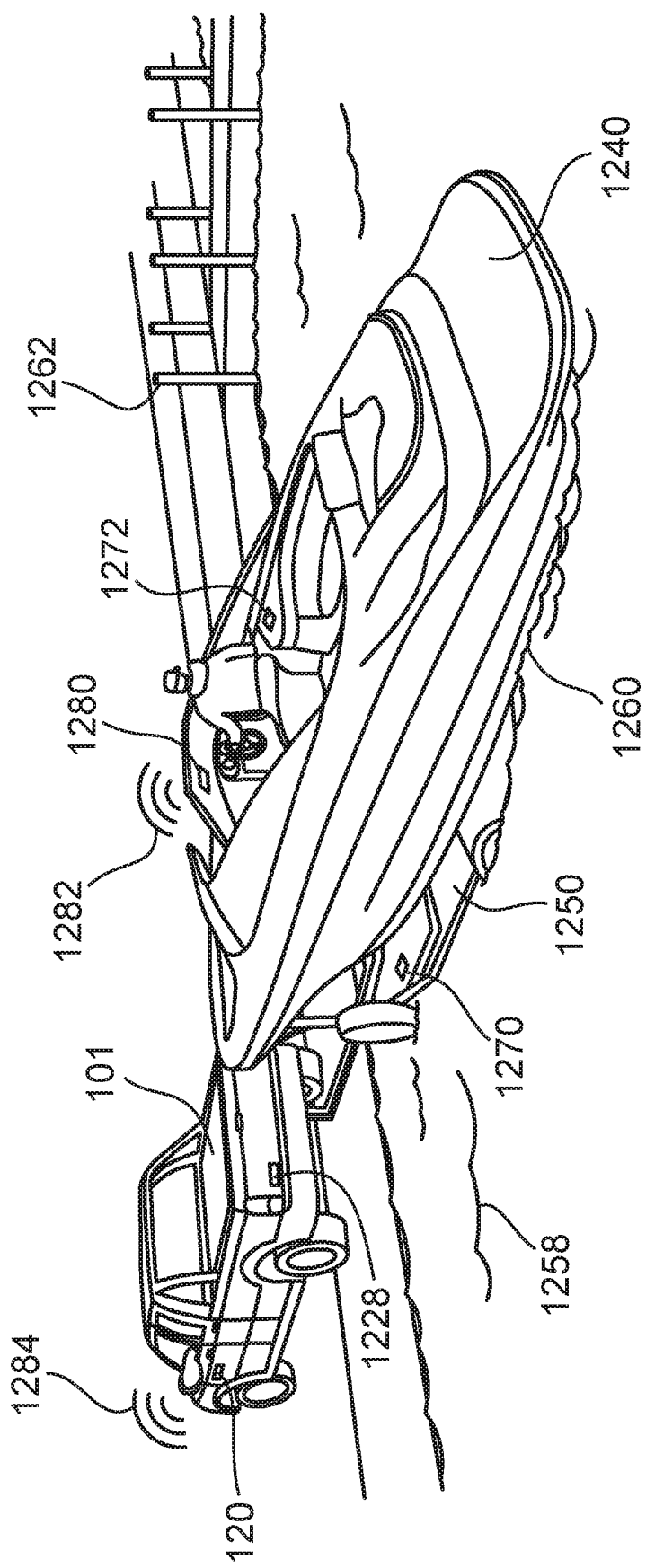
FIG. 12 is a perspective view of a truck and boat trailer backing up to a boat ramp.

FIG. 12 is a perspective view of a truck and boat trailer backing up to a boat ramp. Truck 101 with system 120 guides the truck 101 in backing the boat trailer 1250 with boat 1240 down a boat ramp and into the water 1258. Image sensor 1228 proximity sensor 1270 may communicate location and proximity data to system 120 for control. Additional boat mounted sensor 1272 may also communicate sensor data via wireless signal 1282 to the system 120. Water depth 1260 and obstruction 1262 may be determined by one or more of the sensors and communicated to system 120. Boat mounted user interface 1280 may allow the system 120 to communicate to a user or boat driver.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A system for optimizing a trailer path, comprising:
    at least one trailer image sensor configured to capture images of a trailer attached to a tow vehicle;
    at least one front image sensor configured to capture front images of a vehicle path in front of the tow vehicle;
    at least one behind image sensor configured to capture behind images of a vehicle path behind the tow vehicle and behind the trailer;
    one or more accelerometers that sense acceleration of at least one of the tow vehicle and the trailer;
    a weight determination system that determines the weight of the tow vehicle and the trailer;
    a data input device configured to receive input data;
    a processing device comprising a processor and non-volatile memory;
    wherein the processor is configured to:
    receive image data from the image sensor;
    receive load ratings for a tow vehicle and tow equipment;
    receive weight data from the weight determination system;
    receive accelerometer data from the one or more accelerometers;
    receive input data from the data input device;
    determine a trailer path based on the image data, accelerometer data, and the input data;
    determine at least one safety parameter based on the trailer path, the load ratings, the weight data, the accelerometer data and the input data; and
    communicate the trailer path and the at least one safety parameter to a vehicle control system, thereby prompting adjustments to at least one of the tow vehicle path and tow vehicle acceleration when at least one of the trailer path and acceleration are not within the at least one safety parameters;
    wherein tractrix involute curves are utilized to predict behavior data for the tow vehicle attached to the trailer, wherein the behavior data comprises data describing motion of the tow vehicle; motion of the trailer; motion of the trailer with respect to the tow vehicle; trailer path and vehicle path.

2. The system of claim 1, wherein the processor is configured to predict a future vehicle path and a future trailer path based on the behavior data.

3. The system of claim 1, wherein the processor determines length and width of the trailer.

4. The system of claim 1, wherein the trailer image sensors; front image sensors and behind image sensors capture images representing obstructions to a clear travel path.

5. The system of claim 1, wherein the system further comprises a monitoring device that communicates the image data, the accelerometer data, the at least one safety parameter, and the input data to a monitoring system; and wherein the monitoring device communicates the image data, the accelerometer data, the at least one safety parameter and the input data to the vehicle control system.

6. The system of claim 1, wherein the system sends at least one control command to the vehicle control system, controlling the operation of a tow vehicle based on the determined vehicle path.

7. The system of claim 1, wherein the system sends at least one control command to a hybrid vehicle control system, controlling the operation of a hybrid tow vehicle's electric motor and internal combustion engine based on the determined vehicle path.

8. The system of claim 1, wherein the input device is an OBD device connected by a plug-in connector to a vehicle OBD port.

9. The system of claim 1, wherein the system sends at least one control command to a vehicle computer server.

10. The system of claim 1, wherein the input device receives and transmits data via a wireless interface; and wherein the wireless interface utilizes a protocol of at least one of a Bluetooth, Bluetooth mesh, WIFI, NFC, RFID, BLE, ZigBee, Z-wave, LoRaWAN, Dash7, DigiMesh, ANT, ANT+, NB-IoT, 3G, 4G, SG, LTE or combinations thereof.

11. The system of claim 1, wherein the processor is configured to build a model of a set-up for a specific tow vehicle connected to a specific trailer;
    wherein the model determines at least one mode based on the data associated with the set-up for the model;
    wherein the model is stored in the non-volatile memory;
    wherein the system receives user settings;
    wherein the system communicates the settings for the model to the vehicle control system; and
    wherein the system alerts the user to the settings for the model.

12. The system of claim 11, wherein the non-volatile memory stores factory settings and user settings specific to the model.

13. The system of claim 11, wherein the system further comprises a cloud-based network;

wherein factory settings, the user settings and the sensor data are stored in the memory of the cloud-based network;
wherein the cloud-based network processor is configured to:
  determine set-up specific settings for a specific towing set-up of tow vehicle, trailer and all associated tow equipment; and
  transmit the set-up specific settings to the system based on the sensor data, the factory settings, and the user settings.

14. The system of claim 1, wherein the data input device comprises a cell phone, satellite phone, smartphone, personal digital assistant, tablet computer, laptop computer, remote control device, mobile transmitter, a mobile internet device or a combination of one or more of the same.

15. The system of claim 1, wherein the system further comprises one or more sensors; wherein the one or more sensors produce sensor data; wherein the sensors convert sensor data to an electrical signal; and wherein the sensors comprise at least one of:
  electromagnetic; electrochemical; electric current; electric potential; magnetic; radio; air flow;
  accelerometers; pressure; electro-acoustic; electro-optical; photoelectric; electrostatic;
  thermoelectric; radio-acoustic; environmental; moisture; humidity; fluid velocity; position;
  angle; displacement; or combinations thereof.

16. The system of claim 15, wherein the system further:
  monitors, via the sensors, behavior of a vehicle and its components while driving on a specific trip;
  makes adjustments to the model for the specific trip based on the specific trip sensor data and input data; and
  stores, in the non-volatile memory, an adjusted model based on the adjustments.

17. The system of claim 1, wherein the system operates when the tow vehicle and the trailer are travelling in a forward and a reverse direction.

18. A system for optimizing a trailer path, comprising:
  at least one trailer image sensor configured to capture images of a trailer attached to a tow vehicle;
  at least one front image sensor configured to capture front images of a vehicle path in front of the tow vehicle;
  at least one behind image sensor configured to capture behind images of a vehicle path behind the tow vehicle and behind the trailer;
  one or more accelerometers that sense acceleration of at least one of the tow vehicle and the trailer;
  a weight determination system that determines the weight of the tow vehicle and the trailer;
  a data input device configured to receive input data;
  a processing device comprising a processor and non-volatile memory;
  wherein the processor is configured to:
  receive image data from the image sensor;
  receive load ratings for a tow vehicle and tow equipment;
  receive weight data from the weight determination system;
  receive accelerometer data from the one or more accelerometers;
  receive input data from the data input device;
  determine a trailer path based on the image data, accelerometer data, and the input data;
  determine at least one safety parameter based on the trailer path, the load ratings, the weight data, the accelerometer data, and the input data; and
  communicate the trailer path and the at least one safety parameter to a vehicle control system, thereby prompting adjustments to at least one of the tow vehicle path and tow vehicle acceleration when at least one of the trailer path and acceleration are not within the at least one safety parameter;
  wherein the system operates when the tow vehicle is not connected to the trailer; wherein the trailer is in a stationary position; wherein the tow vehicle is backing up in a reverse direction travelling towards the trailer's trailer hitch; and wherein the system further comprises:
  at least one trailer alignment sensor configured to capture images of the trailer;
  at least one tow vehicle alignment sensor configured to capture images of the tow vehicle;
  wherein the tow vehicle alignment sensor is attached to the trailer;
  wherein the trailer alignment sensor is attached to the tow vehicle;
  at least one hitch position sensor configured to determine position of the trailer hitch;
  at least one receiver position sensor configured to align the trailer hitch with the tow vehicle's receiver hitch;
  wherein the processor is further configured to:
  receive alignment data from the alignment sensors and the position sensors;
  determine a tow vehicle path based on the alignment data; and
  communicate the tow vehicle path to at least one of the user and the vehicle control system, thereby prompting adjustments to at least one of the tow vehicle path and tow vehicle acceleration;
  wherein tractrix involute curves are utilized to predict behavior data for the tow vehicle attached to the trailer, wherein the behavior data comprises data describing motion of the tow vehicle; motion of the trailer; motion of the trailer with respect to the tow vehicle; trailer path and vehicle path.

19. The system of claim 1, wherein the system operates when the trailer is a boat trailer; and wherein the tow vehicle and trailer are backing up in a reverse direction travelling towards a boat launch.

* * * * *